US006810144B2

(12) United States Patent
McGee et al.

(10) Patent No.: US 6,810,144 B2
(45) Date of Patent: Oct. 26, 2004

(54) METHODS OF AND SYSTEM FOR DETECTING A CARTOON IN A VIDEO DATA STREAM

(75) Inventors: Tom McGee, Garrison, NY (US); Radu S. Jasinschi, Ossining, NY (US); Lalitha Agnihotri, Fishkill, NY (US); Jan Nesvadba, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 634 days.

(21) Appl. No.: 09/910,297

(22) Filed: Jul. 20, 2001

(65) Prior Publication Data

US 2003/0016864 A1 Jan. 23, 2003

(51) Int. Cl.[7] .............................. G06K 9/00; H04N 5/14
(52) U.S. Cl. ....................................... 382/166; 348/700
(58) Field of Search ................................ 382/162, 165, 382/166, 168, 199, 236, 239, 250, 251, 284; 348/449, 452, 700, 701, 702; 345/441, 473, 474, 588, 684; 375/240.01, 240.02, 240.24

(56) References Cited

U.S. PATENT DOCUMENTS

| 4,305,131 A | | 12/1981 | Best |
| 5,019,899 A | | 5/1991 | Boles et al. |
| RE33,662 E | | 8/1991 | Blair et al. |
| 5,353,074 A | * | 10/1994 | Jones et al. ................... 353/122 |
| 5,546,474 A | | 8/1996 | Zuniga ........................ 382/176 |
| 5,592,226 A | | 1/1997 | Lee et al. |
| 5,696,892 A | * | 12/1997 | Redmann et al. ............ 345/582 |
| 5,828,786 A | | 10/1998 | Rao et al. |
| 5,835,163 A | * | 11/1998 | Liou et al. ................... 348/700 |
| 5,854,856 A | | 12/1998 | Moura et al. |
| 5,920,360 A | * | 7/1999 | Coleman, Jr. ................ 348/700 |
| 5,923,784 A | | 7/1999 | Rao et al. |
| 6,040,861 A | | 3/2000 | Boroczky et al. |
| 6,041,142 A | * | 3/2000 | Rao et al. ..................... 382/232 |
| 6,061,462 A | | 5/2000 | Tostevin et al. |
| 6,108,922 A | | 8/2000 | Lee |
| 6,125,229 A | | 9/2000 | Dimitrova et al. |
| 6,137,544 A | | 10/2000 | Dimitrova et al. |
| 6,208,359 B1 | * | 3/2001 | Yamamoto ................... 345/473 |
| 6,522,329 B1 | * | 2/2003 | Ihara et al. .................. 345/441 |
| 6,522,332 B1 | * | 2/2003 | Lanciault et al. ............. 345/473 |
| 6,700,586 B1 | * | 3/2004 | Demers ....................... 345/588 |
| 6,738,065 B1 | * | 5/2004 | Even-Zohar ................. 345/473 |

FOREIGN PATENT DOCUMENTS

WO    27865 A1    4/2001    ............ G06K/9/20

OTHER PUBLICATIONS

"MEPG–7: A Content Description Standard Beyond Compression", Abdel–Mottaleb et al, 42$^{nd}$ Midwest Symposium on Circuits and Systems, 1999, Aug. 8–11, 1999, vol. 2, pp. 770–777, XP010511065.

* cited by examiner

Primary Examiner—Andrew W. Johns
Assistant Examiner—Amir Alavi
(74) Attorney, Agent, or Firm—John F. Vodopia

(57) ABSTRACT

A method of and system for detecting a cartoon in a video stream are provided. The system comprises a storage device for storing the encoded signal and a processor for processing low parameter information extracted from the encoded video signal. The information is extracted based on the predetermined characteristics of a typical cartoon. At least one value is computed based on the low parameter information and it is compared to the predetermined values for natural video. Based on the comparison the determination is made whether the video sequence contains a cartoon.

46 Claims, 19 Drawing Sheets

METHODS OF AND SYSTEM FOR DETECTING A CARTOON IN A VIDEO DATA STREAM

FIELD OF THE INVENTION

The present invention relates to detection of video data and, more particularly to detection of a cartoon in a common video data stream.

BACKGROUND OF THE INVENTION

Identifying a specific kind of genre, i.e. cartoons, motion pictures, commercials, etc., in a video data signal through automated manual means has been a challenge through the years dating back to the inception of digital media.

Typically, analyzing video data for the purpose of detecting their content involves examining a video signal, which could have been encoded. The encoding, which in this case involves compression, of video signals for storage or transmission and the subsequent decoding is well-known. One of the video compression standards is MPEG, which stands for Moving Picture Expert Group. MPEG is an ISO, the International Standards Organization. "MPEG video" actually consists at the present time of two finalized standards, MPEG-1 and MPEG-2, with a third standard, MPEG-4, in the process of being finalized.

MPEG video compression is used in many current and emerging products. MPEG is at the heart of digital television set-top boxes, DSS, HDTV decoders, DVD players, video conferencing, Internet video, and other applications. These applications benefit from video compression by requiring less storage space for archived video information, less bandwidth for the transmission of the video information from one point to another, or a combination of both.

While color is typically represented by 3 color components—red (R), green (G) and blue (B), in the video compression world it is represented by luminance and chrominance components. Research into human visual system has shown that the eye is more sensitive to changes in luminance, and less sensitive to variations in chrominance. MPEG operates on a color space that effectively takes advantage of the eye's different sensitivity to luminance and chrominance information. Thus, MPEG uses the YCbCr color space to represent the data values instead of RGB, where Y is the luminance component, experimentally determined to be Y=0.299R+0.587G+0.114B, Cb is the blue color difference component, where Cb=B−Y, and Cr is the red color difference component, where Cr=R−Y.

MPEG video is arranged into a hierarchy of layers to help with error handling, random search and editing, and synchronization, for example with an audio bit-stream. The first layer, or top layer, is known as the video sequence layer, and is any self-contained bitstream, for example a coded movie, advertisement or a cartoon.

The second layer, below the first layer, is the group of pictures (GOP), which is composed of one or more groups of intra (I) frames and/or non-intra (P and/or B) pictures as illustrated in FIG. 1. I frames are strictly intra compressed. Their purpose is to provide random access points to the video. P frames are motion-compensated forward-predictive-coded frames. They are inter-frame compressed, and typically provide more compression than I frames. B frames are motion-compensated bidirectionally-predictive-coded frames. They are inter-frame compressed, and typically provide the most compression.

The third layer, below the second layer, is the picture layer itself. The fourth layer beneath the third layer is called the slice layer. Each slice is a contiguous sequence of raster ordered macroblocks, most often on a row basis in typical video applications. The slice structure is intended to allow decoding in the presence of errors. Each slice consists of macroblocks, which are 16×16 arrays of luminance pixels, or picture data elements, with two 8×8 arrays (depending on format) of associated chrominance pixels. The macroblocks can be further divided into distinct 8×8 blocks, for further processing such as transform coding, as illustrated in FIG. 2. A macroblock can be represented in several different manners when referring to the YCbCr color space. The three formats commonly used are known as 4:4:4, 4:2:2 and 4:2:0 video. 4:2:2 contains half as much chrominance information as 4:4:4, which is a full bandwidth YCbCr video, and 4:2:0 contains one quarter of the chrominance information. As illustrated in FIG. 3, because of the efficient manner of luminance and chrominance representation, the 4:2:0 representation allows immediate data reduction from 12 blocks/macroblock to 6 blocks/macroblock.

Because of high correlation between neighboring pixels in an image, the Discrete Cosine Transform (DCT) has been used to concentrate randomness into fewer, decorrelated parameters. The DCT decomposes the signal into underlying spatial frequencies, which then allow further processing techniques to reduce the precision of the DCT coefficients. The DCT and the Inverse DCT transform operations are defined by Equations 1 and 2 respectively:

$$F(\mu, v) = \frac{1}{4} C(\mu) C(v) \sum_{x=0}^{7} \sum_{y=0}^{7} f(x, y) \cos\left[\frac{(2x+1)\mu\pi}{16}\right] \cos\left[\frac{(2y+1)v\pi}{16}\right] \quad \text{[Equation 1]}$$

$$C(\mu) = \frac{1}{\sqrt{2}} \text{ for } \mu = 0$$

$$C(\mu) = 1 \text{ for } \mu = 1, 2, \ldots, 7$$

$$f(x, y) = \frac{1}{4} \sum_{\mu=0}^{7} \sum_{v=0}^{7} C(\mu) C(v) F(\mu, v) \cos\left[\frac{(2x+1)\mu\pi}{16}\right] \cos\left[\frac{(2y+1)v\pi}{16}\right] \quad \text{[Equation 2]}$$

As illustrated in FIG. 2, a block is first transformed from the spatial domain into a frequency domain using the DCT, which separates the signal into independent frequency bands. The lower frequency DCT coefficients toward the upper left corner of the coefficient matrix correspond to smoother spatial contours, while the DC coefficient corresponds to a solid luminance or color value of the entire block. Also, the higher frequency DCT coefficients toward the lower right corner of the coefficient matrix correspond to finer spatial patterns, or even noise within the image. At this point, the data is quantized. The quantization process allows the high energy, low frequency coefficients to be coded with greater number of bits, while using fewer or zero bits for the high frequency coefficients. Retaining only a subset of the coefficients reduces the total number of parameters needed for representation by a substantial amount. The quantization process also helps in allowing the encoder to output bit-streams at specified bitrate.

The DCT coefficients are coded using a combination of two special coding schemes: Run length and Huffman. Since most of the non-zero DCT coefficients will typically be concentrated in the upper left corner of the matrix, it is apparent that a zigzag scanning pattern, as illustrated in FIG.

2, will tend to maximize the probability of achieving long runs of consecutive zero coefficients.

MPEG-2 provides an alternative scanning method, which may be chosen by the encoder on a frame basis, and has been shown to be effective on interlaced video images. Each non-zero coefficient is associated with a pair of pointers: first, the coefficient's position in the block which is indicated by the number of zeroes between itself and the previous non-zero coefficient and second, by the coefficient value. Based on these two pointers, the coefficient is given a variable length code from a lookup table. This is done in a manner so that a highly probable combination gets a code with fewer bits, while the unlikely ones get longer codes. However, since spatial redundancy is limited, the I frames provide only moderate compression. The P and B frames are where MPEG derives its maximum compression efficiency. The efficiency is achieved through a technique called motion compensation based prediction, which exploits the temporal redundancy. Since frames are closely related, it is assumed that a current picture can be modeled as a translation of the picture at the previous time. It is possible then to accurately predict the data of one frame based on the data of a previous frame. In P frames, each 16×16 sized macroblock is predicted from macroblock of previously encoded I picture. Since frames are snapshots in time of a moving object, the macroblocks in the two frames may not correspond to the same spatial location. The encoder would search the previous frame (for P-frames, or the frames before and after for B-frames) in half pixel increments for other macroblock locations that are a close match to the information that is contained in the current macroblock. The displacements in the horizontal and vertical directions of the best match macroblocks from the cosited macroblock are called motion vectors. If no matching macroblocks are found in the neighboring region, the macroblock is intra coded and the DCT coefficients are encoded. If a matching block is found in the search region the coefficients are not transmitted, but a motion vector is used instead. The motion vectors can also be used for motion prediction in case of corrupted data, and sophisticated decoder algorithms can use these vectors for error concealment. For B frames, motion compensation based prediction and interpolation is performed using reference frames present on either side of it.

Video content analysis involves automatic and semi-automatic methods to extract information that best describes the content of the recorded material. Extracting information can be as simple as detecting video scene changes and selecting the first frame of a scene as a representative frame. The identification of the video can also be stored in the header information of a video stream. For example, in the area of personal video recorders there are now set top boxes (STB) which can download video information and store it on internal hard drives. Some STBs provide Electronic Program Guides (EPG), which are interactive, on-screen analog to TV listings found in local newspapers or other print media, but some do not. In the absence of EPGs it is extremely difficult for the STB to know whether the program a viewer is watching is a movie, commercial, news, a cartoon or other television genre. However, if the content of the video stream can be analyzed through a computerized automatic process, the whole video stream can be segmented by content without the need for EPGs. While there are various patents on content analysis of video streams, none of them can differentiate among cartoons and other types of genre. For example, if a viewer wants to record only cartoons which are televised on a particular day, he or she will only be able to choose specific time boundaries for the recording, thus including not only cartoons, but other useless content.

Furthermore, EPGs, even when they are present, do not precisely convey the information to a viewer. Changes in scheduling or special programming interruptions will not show up on EPGs. Hence, the cartoon desired to be recorded, may go beyond the specified time boundaries.

The more advanced STBs have a functionality of detecting what the viewer has been watching and sending this information back to the broadcaster. Based on this extracted data, the user's personal profile is created, and recommendations are made based on the user's preferences. However, this television recommender system relies heavily either on the EPG or a content detection process, which is imprecise and unsophisticated enough to detect cartoons.

SUMMARY OF THE INVENTION

It is, therefore, an object of the present invention to provide a more precise system and method for detecting a cartoon sequence in a video data stream.

In one aspect, a method is provided which comprises the steps of obtaining a video data stream; extracting data from the video data stream; computing at least one first value based on the data indicative of at least one predetermined characteristic of a typical cartoon; comparing at least one of the first values to second values indicative of the at least one characteristic of a natural video sequence; and determining whether the video data stream contains a cartoon sequence based on the comparison. Video data includes, but is not limited to, visual, audio, textual data or low parameter information extracted from raw data or encoded data stream.

In another aspect, a system for detecting a cartoon sequence is provided which comprises a communications device for receiving a video signal; a storage device capable of storing the video signal; a processor operatively associated with the communications device and the storage device, the processor being capable of performing the steps of extracting data from the video signal; determining whether the video signal contains the cartoon sequence based on a predetermined method; and generating an output based on the determination to be stored in the storage device. In accordance with another aspect of the present invention, the video signal can be encoded.

The above, as well as further features of the invention and advantages thereof, will be apparent in the following detailed description of certain advantageous embodiments which is to be read in connection with the accompanying drawings forming a part hereof, and wherein corresponding parts and components are identified by the same reference numerals in the several views of the drawings.

BRIEF DESCRIPTION OF THE DRAWINGS

Embodiments of the invention will now be described by way of example with reference to the following figures in which.

DETAILED DESCRIPTION OF THE PREFERRED EMBODIMENT(S)

Figure 4:
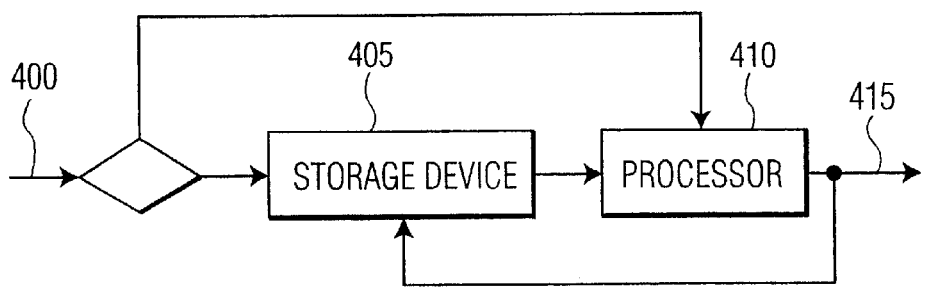
FIG. 4 is a block diagram of an illustrative embodiment of a cartoon detection system in accordance with one embodiment of the present invention.

According to a preferred embodiment of the present invention as illustrated in FIG. 4, a cartoon detection system comprises a storage device 405, which receives a video signal 400, and a processor 410 coupled to the storage device 405. The video signal 400 may have been encoded. The video signal 400 typically comes in analog or digital format from a broadcasting station or is prerecorded on a storage medium, such as CD, DVD, laser discs or other medium capable of storing encoded video data. The encoding standard may be MPEG-1,2,4 or other digital schemes (compressed or uncompressed).

The video signal 400 is typically stored in the storage device 405 and passed on to the processor 410. The processor 410 analyzes the video signal 400 and detects whether the video signal 400 contains a cartoon. If a cartoon is detected, the processor 410 generates an identification signal 415 containing information about the video signal 400, i.e. what particular frames are indexed as those of a typical cartoon. Subsequently, the identification signal 415 is stored in the storage device for identification purposes. Alternatively, the storage device 405 can be bypassed and the video signal would be directly passed into the processor 410, which after detecting a cartoon would pass the identification signal 415 to the storage device 405. Yet, in another alternative embodiment, the identification signal is not stored in the storage device, but simply passed on to the display unit (figure not shown) in real time, so that the user can be alerted what is broadcasted on other television stations.

Figure 5:
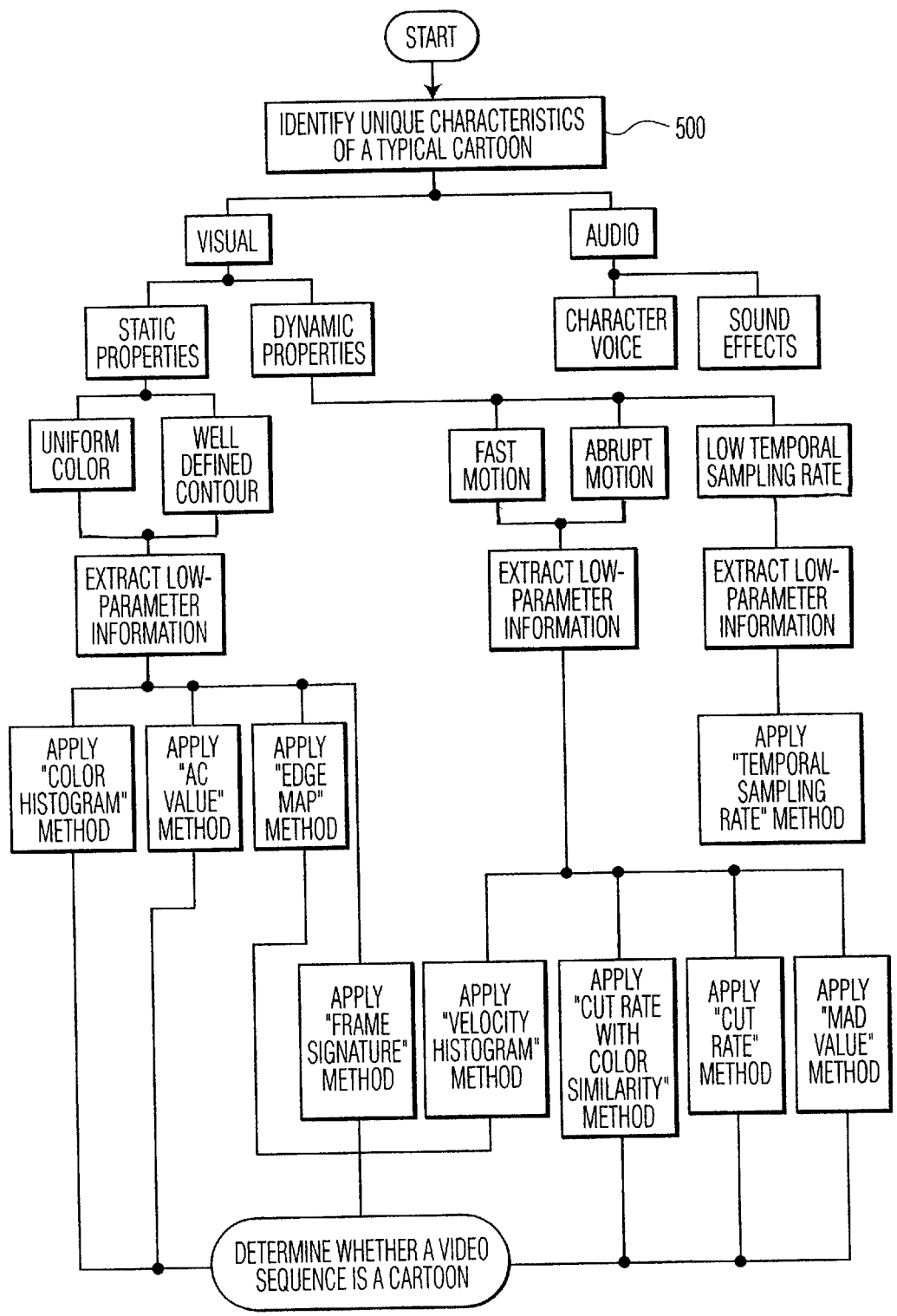
FIG. 5 is a flow chart illustrating the cartoon detection method in accordance with one embodiment of the present invention.

A cartoon detection method according to a preferred embodiment of the present invention is illustrated in FIG. 5. To detect a cartoon in a video data stream, the characteristics of a typical cartoon as compared to a natural video need to be identified as shown at step 500 in FIG. 5. The term "natural video" refers to, but not limited to a typical video signal, such as motion picture or news broadcast. The unique characteristics of a typical cartoon can be divided into visual and audio properties. For example, character voices in a typical cartoon can be characterized as sounding unnatural. Sound effects are loud with short instrument or artifact noises. The visual properties can be dynamic and static. The visual static properties include characteristics such as uniform color and well defined contours. For example, the typical cartoons especially the older ones which were hand drawn, have well defined clear boundaries with mostly no shading and with uniformly colored patches. The simpler cartoons have simple shapes and coloring.

The visual dynamic properties of a typical cartoon include characteristics such as fast motion and abrupt changes. For example, in cartoon video sequences the motion of regions contains many high-speed sections and the cut rate is typically high. Additionally, cartoons differ from other genres with respect to temporal sampling rate. Cartoons in a video sequence are temporally sub-sampled to six frames per second. This induces the perception of jerkiness. The motion looks abrupt. However, the low frame rate helps production process, because every frame is drawn by hand (in the case of old classic cartoons) and thus the process is less costly. In contrast, a standard video is sampled at about 24–30 frames per second and looks much smoother.

After identifying the characteristics of a typical cartoon, video data is extracted from the video signal. Video data includes, but is not limited to, visual, audio, textual data or low parameter information extracted from raw data or encoded data stream. This information is representative of the characteristics. For example, based on the presumable color uniformity throughout a frame of a cartoon, the color distribution throughout the frame is extracted, i.e. color value of each pixel. AC values of each frame, which essentially correspond to contrast changes throughout the frame, can also be extracted. To take advantage of the known characteristic such as well defined contours, all of the low parameter information necessary for the generation of the edge map will be extracted out of the encoded video signal. Other information such as frame rate, block velocity, DC values and others can be extracted for application of various cartoon detection methods which are based on known cartoon characteristics.

Finally, after the extraction of the low parameter information, the appropriate cartoon detection methods are applied. These methods take advantage of the known unique characteristics of a typical cartoon and thus are capable to detect whether a video data stream is that of a cartoon. According to a preferred embodiment of the present invention all of the detection methods are used in combination with each other to add precision to the detection process. Although some of these detection methods are conclusive by themselves, such as Temporal Sampling Rate method, others will be more precise when used in combination with each other. Thus, while one of the methods may detect a cartoon another might not. Therefore, all methods should be combined and weighed.

Color Histogram Method

The color distribution of an image can be represented by a histogram each of whose bins corresponds to a range of values of each of the color components. For an 8-bit image, the color components will range from 0 to 255 in value.

Figure 6:
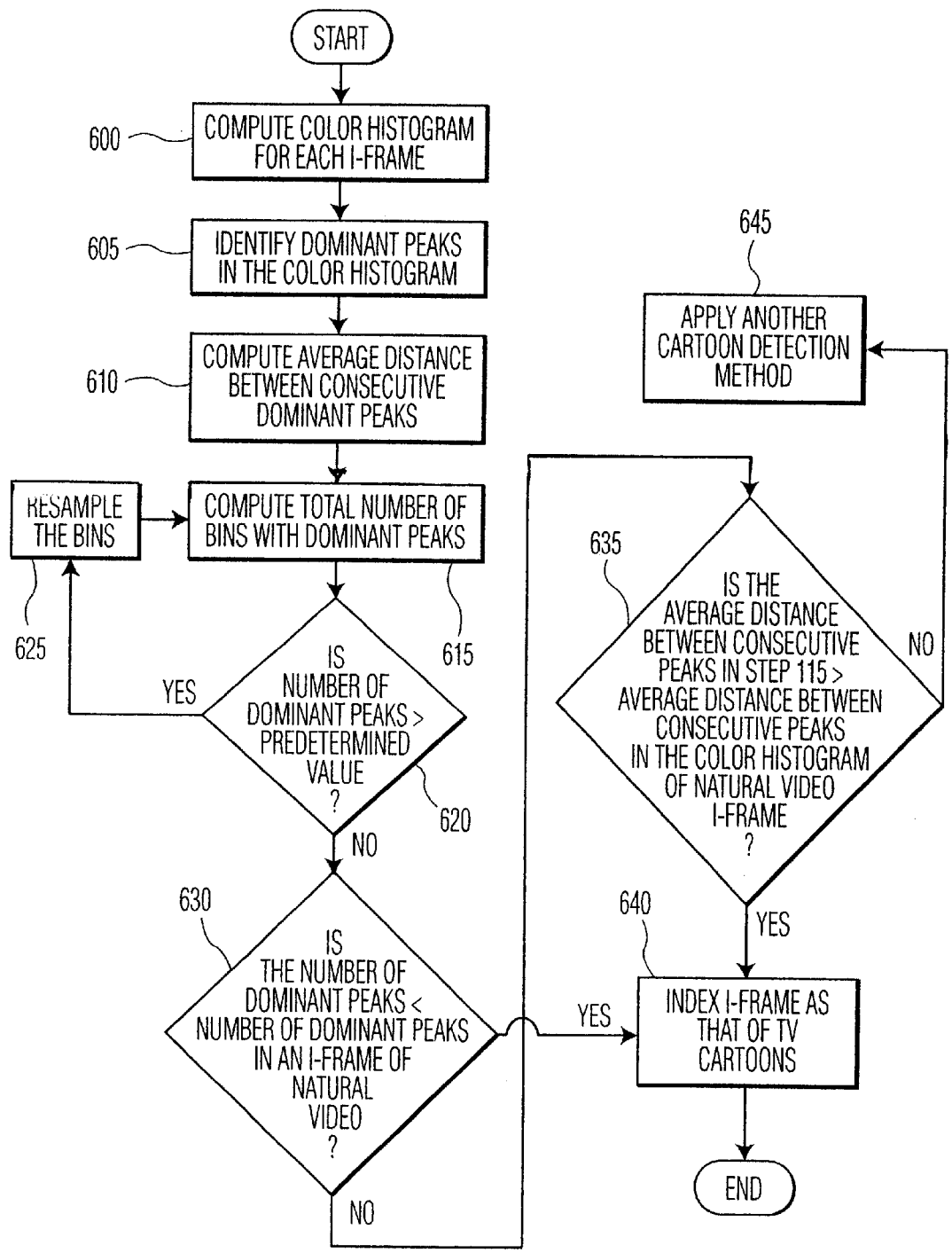
FIG. 6 is a flow chart illustrating the "Color Histogram" detection method in accordance with one embodiment of the present invention.

The first step as illustrated in the flow chart in FIG. 6 at step 600 is to compute a color histogram for each I-frame in an encoded video stream. The color histogram is computed for highest granularity, which means for the largest number of bins, i.e. if there are 256 possible values then the histogram is computed for 256 bins.

Alternatively, other quantization schemes can be used. Color quantization is typically the first step in computation of video histograms. There are various methods for color quantization and they are well known in the art. The factors involved are: which color space to use, how many colors to choose and how to subdivide the color space. For example, 128 bins can also be used for Y or 288 total bins with Y, $C_r$, $C_b$ scaled down. There are many available possibilities. For purposes of example, and since MPEG operates in this space, Y, $C_r$, $C_b$ color space is used throughout. Alternatively, HSB (Hue, Saturation, Brightness) color space can be used to define the basic color bins. To filter out any noise, a smoothing operation can be performed next, but it is not necessary. Image Smoothing is the set of local preprocessing methods, which have the aim to suppress noise or other small fluctuations in the image by using redundancy in the image data and is equivalent to the suppression of high frequencies in the frequency domain. Various image smoothing techniques are well known to those skilled in the art.

Figure 7A:
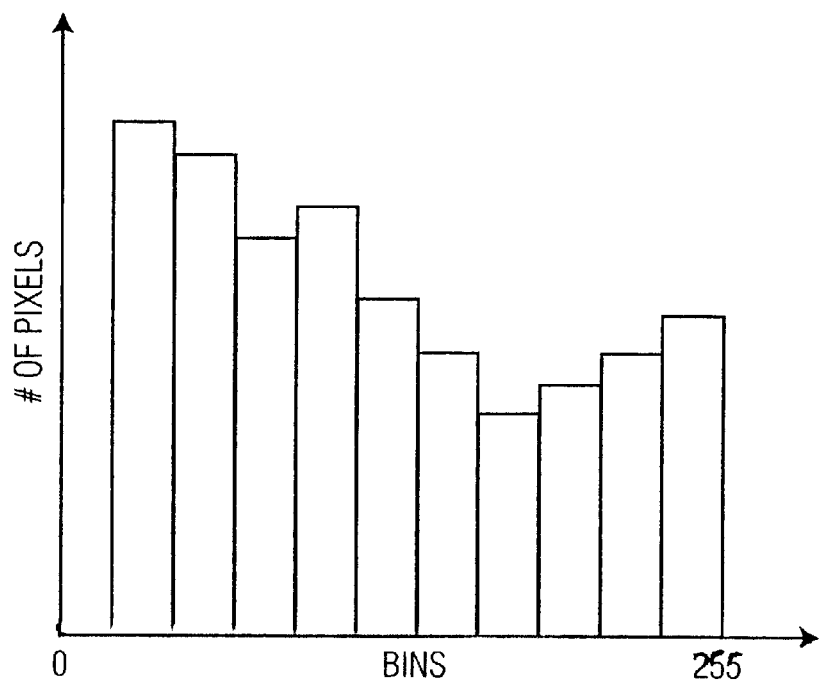
FIG. 7 is a graphical illustration of the "Color Histogram" detection method in accordance with one embodiment of the present invention.

At step 605, dominant peaks are identified in the color histogram. Typically, a dominant peak is defined as the one for which full width at half maximum value (FWHM) is greater than 10, but less than 60. For a standard video, there are typically no dominant peaks as illustrated in FIG. 7A, or only one or two dominant peaks and the histogram is spread out through the entire spectrum. Even if there are one or two dominant peaks, they do not occur for long due to scene changes and the histograms tend to change a lot over time.

Figure 7B:
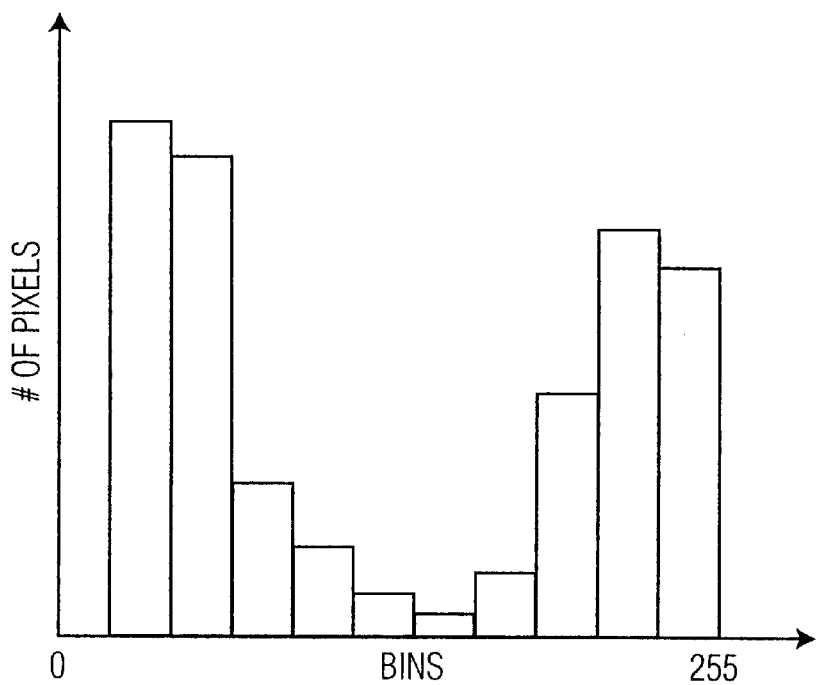

For cartoons, on the other hand, as illustrated in FIG. 7B, there are 4–5 dominant peaks and the histogram is not spread out, i.e., almost 90% of the pixels lie in only 50% or less of the entire spectrum. This limited spread typically continues during the entire duration of the cartoon.

Figure 7C:
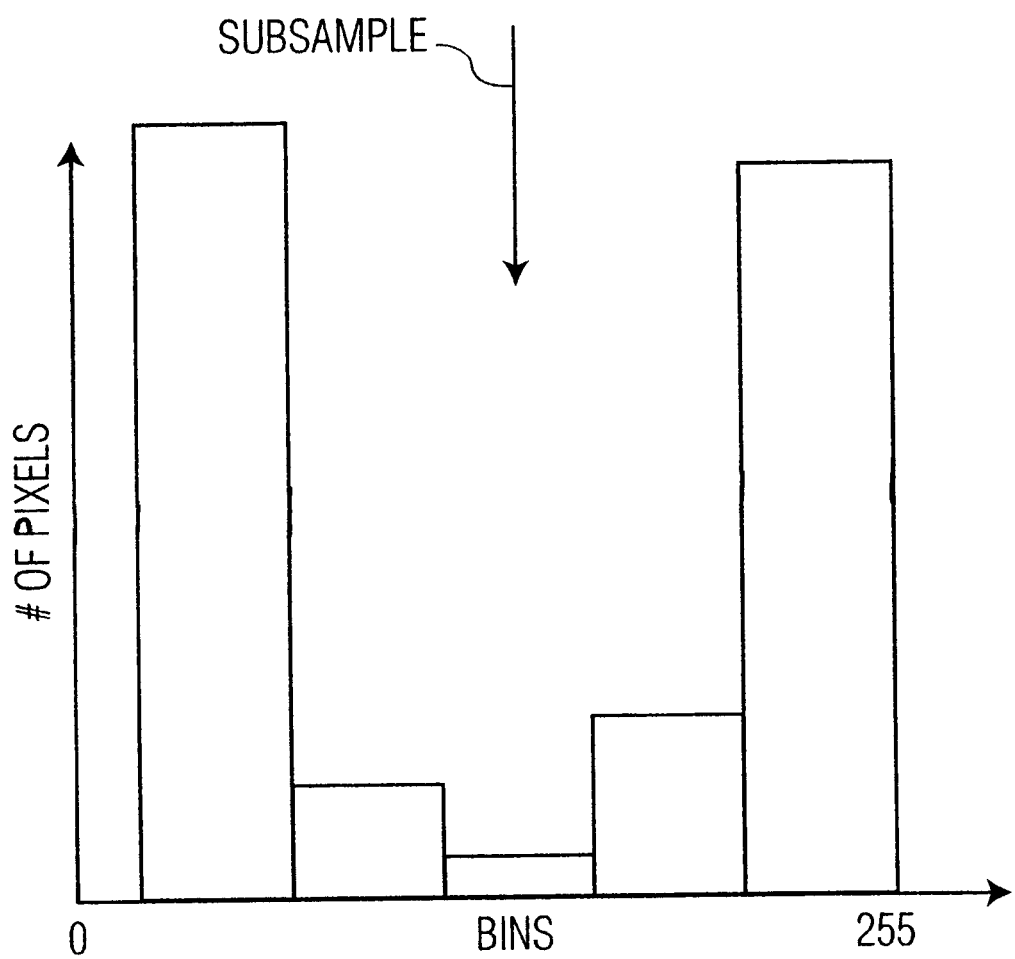

At step 610 the average distance between consecutive dominant peaks is calculated and it is followed by the computation of total number of bins with dominant peaks at step 615. If there are many dominant peaks and especially if they are next to each other, the bins are resampled at step 625. Subsampling step is illustrated from FIGS. 7B to 7C for purposes of example.

If the number of dominant peaks in the color histogram of the target I-frame is greater than the number of dominant peaks in the color histogram of a natural video then the target I-frame is indexed as that of a television cartoon.

This typically means that if the number of dominant peaks in the color histogram of the target I-frame is greater than or equal to two and less than ten and the histogram is concentrated in a limited portion of the spectrum then the target I-frame belongs to the cartoon part of the video stream. This evaluation is made at step 630. The next determinative factor in detecting a cartoon is the average distance between consecutive dominant peaks. In a typical cartoon the dominant peaks are more spread out. Therefore, as illustrated at step 635, if the average distance between consecutive peaks in a color histogram of target I-frame is greater than the average distance between consecutive peaks in the color histogram of a standard video I-frame, then the target I-frame is indexed as that of a TV cartoon based on the "Color Histogram" method.

Edge Map Method

The Edge Map method attempts to detect hand drawn, black pen kind of boundaries which are characteristic to a cartoon. There are many techniques well known in the art for detecting edges in natural images. The basic approach is to detect abrupt changes in intensity in the Y component of the image. For cartoons, the techniques are simpler since the boundaries are typically well defined with minimum of shading.

Edge detection is a fundamental operation in image processing. Its goal is to determine regions in images which correspond to "large" changes in intensity (gray-level) variations. The underlying assumption is that the loci for these intensity variations correspond to "meaningful" image information, e.g., the shape contour of a face. Edge detection is realized in two steps: (i) local operations; (ii) global operations. The local operations involve the use of masks, which approximate, typically band-pass operators, in the digital domain. These masks implement differences of the image intensity in local neighborhoods. The global operations are necessary to transform the image obtained from the result of applying the local operations to a binary image; the latter image represents the edge map, i.e., regions corresponding to the loci of large intensity variations. There are many different approaches to edge detection. For example, a class of gradient-based operators which are commonly used in their digital implementation: the Roberts, Prewitt, Sobel, and isotropic operators. The edge detection techniques such as the Canny and the Marr-Hildreth are also well known in that art.

Figure 8:
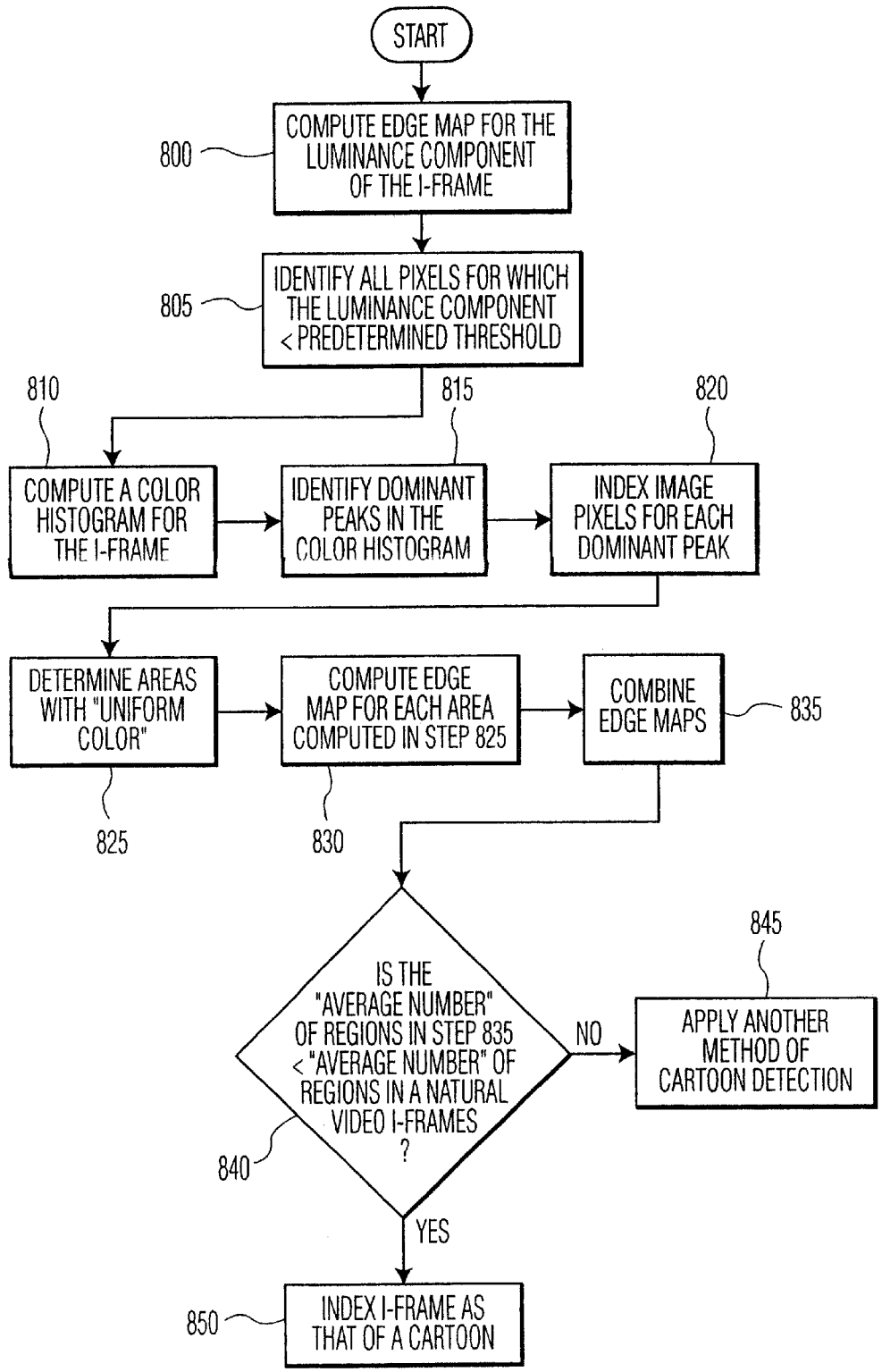
FIG. 8 is a flow chart illustrating the "Edge Map" detection method in accordance with one embodiment of the present invention.
Figure 9:
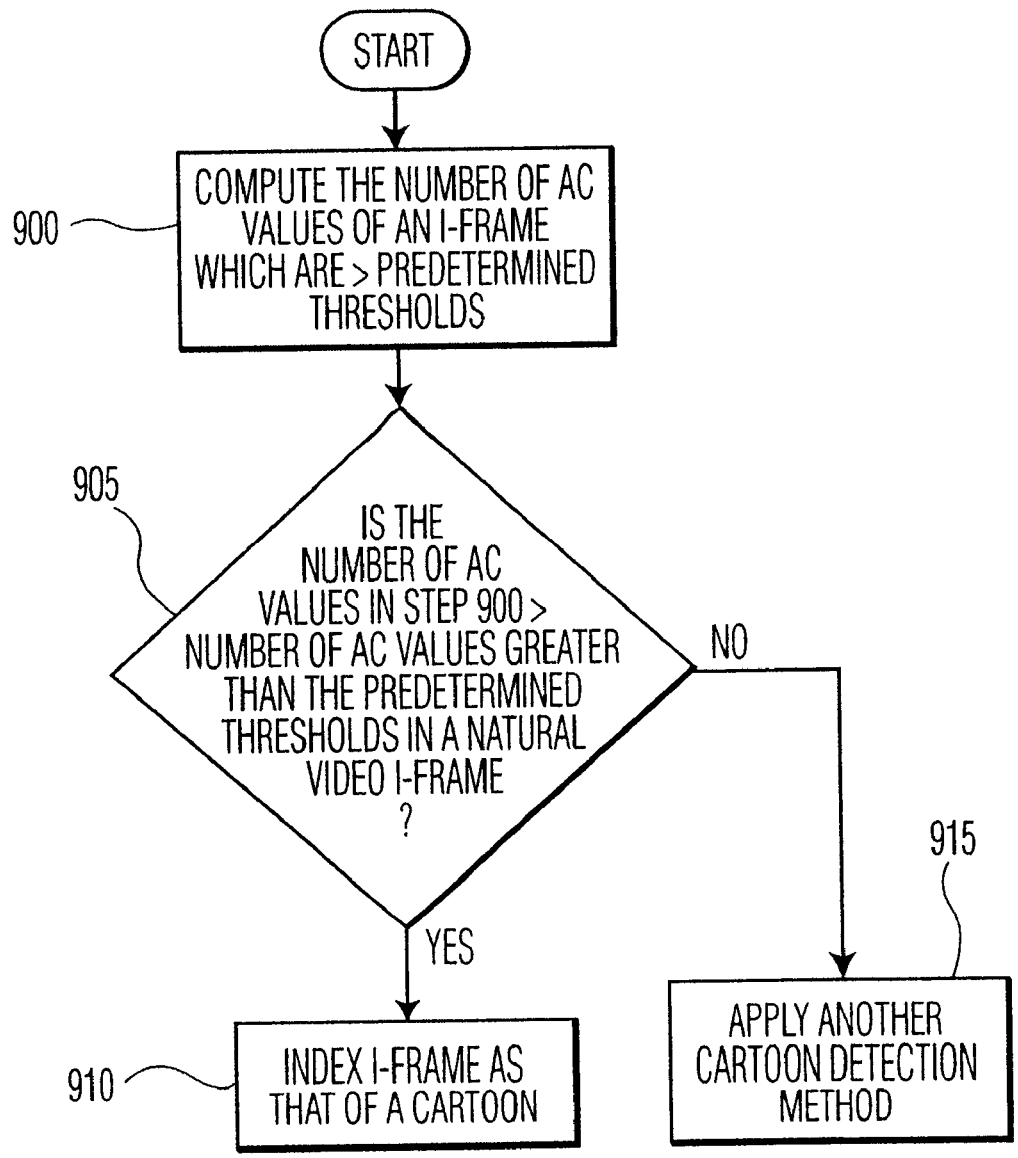
FIG. 9 is a flow chart illustrating the "AC value" detection method in accordance with one embodiment of the present invention.

Therefore the first step (800) as illustrated in FIG. 8 is to compute the edge map for the luminance component of the I-frame of the video data stream with all the pre/post-processing used in standard algorithms. Y component of the I-frame is a gray level image which has intensities typically ranging from 0 to 255 in digital domain. One of the first pre-processing steps is to smooth out the image and then apply a gradient operator. Gradient operators are based on local derivatives of the image function. Derivatives are bigger at locations of the image where the image function undergoes rapid changes. The aim of gradient operators is to indicate such locations in the image. Unlike smoothing, gradient operators have a similar effect as suppressing low frequencies in the frequency domain. Noise is often high frequency in nature and unfortunately if a gradient operator is applied to an image, the noise level increases simultaneously. Thus, smoothing and gradient operators have conflicting aims. Some pre-processing algorithms solve this problem and permit smoothing and edge enhancement simultaneously. So after applying a convolution mask, such as, Gaussian convolution mask, for example, the derivative operator such as Laplacian can be applied (Equation 3). Laplacian has the same properties in all directions and is therefore invariant to rotation in the image.

$$\nabla^2(x, y) = \frac{\partial^2 g(x, y)}{\partial x^2} + \frac{\partial^2 g(x, y)}{\partial y^2} \qquad \text{Equation (3)}$$

The result of the operations is an edge detection operator. Following the pre-processing steps the post-processing steps are taken which can include edge linking and binarization of the image.

The next step 805 involves computing for the same I-frame all pixels for which the luminance component is below a predetermined threshold, for example 20/10 to determine the dark/black pixels. At step 810 the color histogram is computed which is equivalent to step 600. Similarly, at step 815 dominant peaks are identified and the image pixels are indexed for each dominant peak at step 820. The color histogram is used to determine image regions with uniform color. These regions can be segmented and their boundaries can be determined. Consequently, from step 820 the areas with uniform color can be determined (step 825). However, not all pixels typically fit the segmentation pattern developed by the dominant peaks of the color histogram. Therefore, to encompass all the pixels, region growing is performed on the areas with uniform color until the boundaries (detected edges) are reached. Region growing is a general technique for image segmentation, where image characteristics are used to group adjacent pixels together to form regions. Various region growing algorithms are well known in the art. Following region growing, the edge map is computed for each area with uniform color (step 830). To produce a more accurate approximation, the edge maps from steps 800 (Edge map using operators), 820 (edge map using pixels in dominant peaks), and 830 (edge map based on region growing) are then combined, i.e. they are compared to each other (step 835). At step 840 average number of uniformly colored regions evaluated in step 835 is computed and compared to the average number of uniformly colored regions in a natural video I-frames (step 840). If the latter is greater, then the target I-frame is indexed as that of a television cartoon (step 850) based on the "Edge Map" method.

AC Value Method

Figure 1:
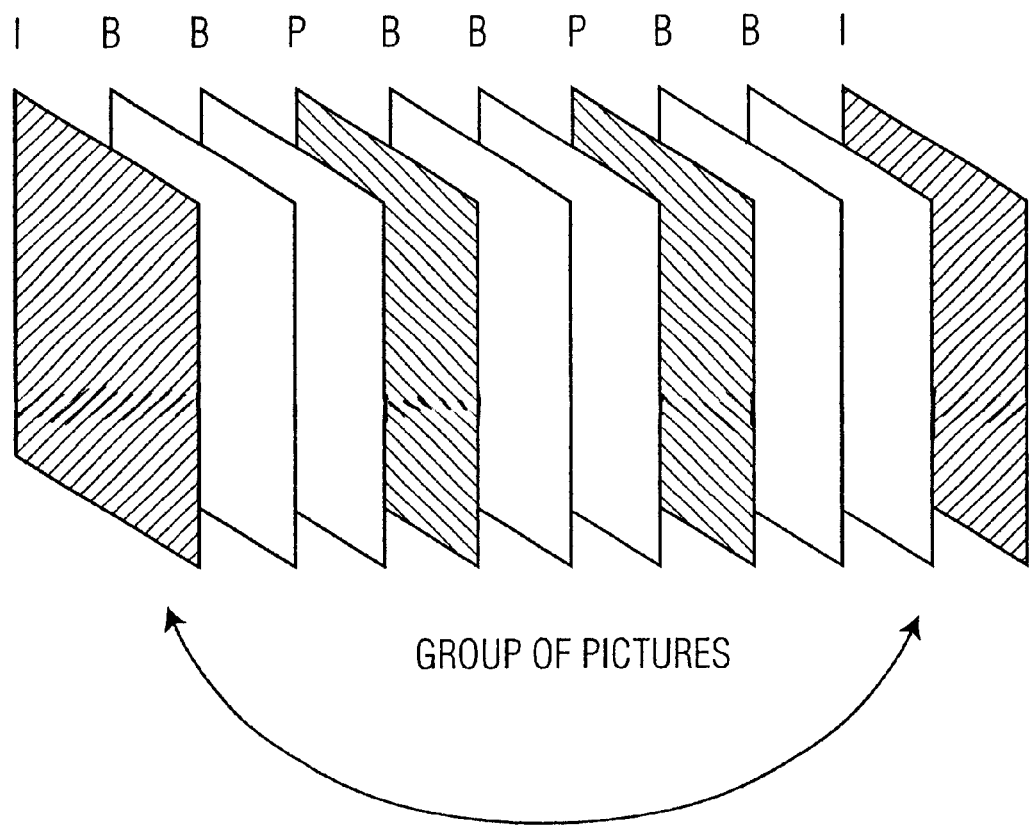
FIG. 1 is an illustration of an MPEG video sequence in accordance with prior art.
Figure 2:
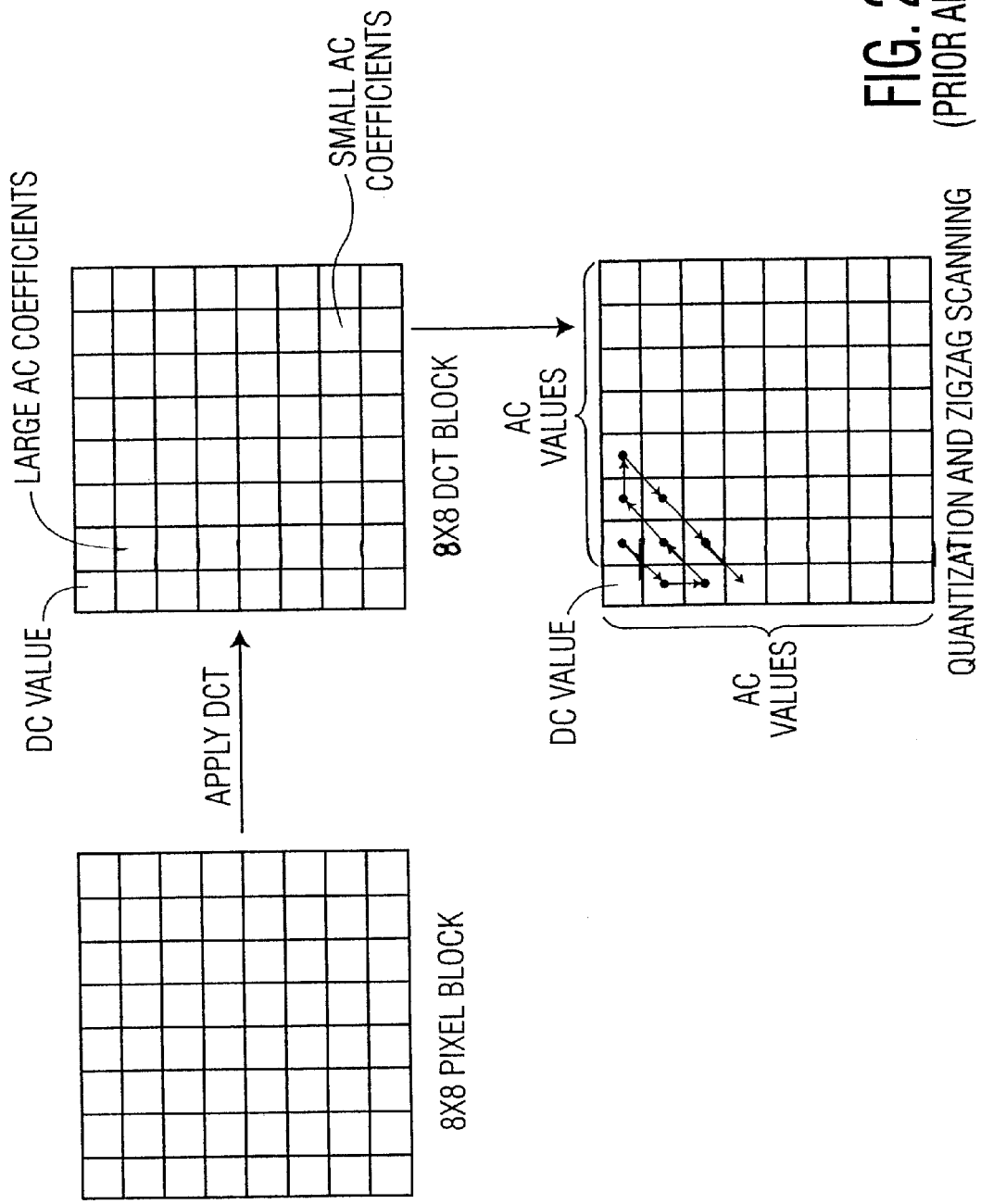
FIG. 2 is an illustration of intra-coding technique, employing block based DCT and zigzag scanning in accordance with prior art.
Figure 3:
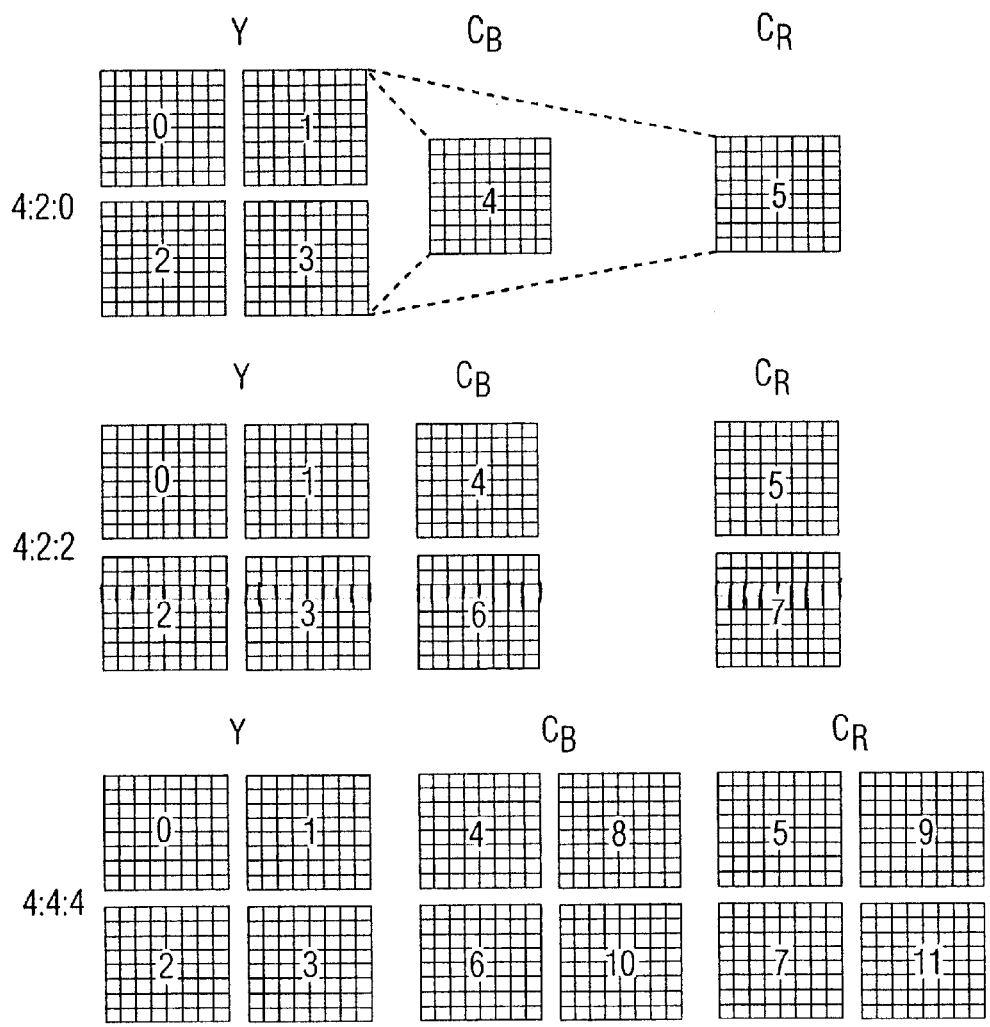
FIG. 3 is an illustration of various video formats in accordance with the prior art.

After the DCT transformation as illustrated in FIG. 2B, each of the blocks Y0, Y1, Y2, Y3, Cr and Cb (as shown in FIG. 3 for 4:2:0 for example) contains in the uppermost left hand corner DC information (DC value) and the remaining DCT coefficients contain AC information (AC values). The AC values increase in frequency in a zig-zag order from the right of the DC value, to the DCT coefficient just beneath the DC value, as partially shown in FIG. 2C.

Broadly defined, DC value is an average intensity throughout the frame and AC values are indicative of the changes in contrast. Thus, the higher the frequencies the more contrast changes there are. Since typical cartoons contain more changes in contrast than natural videos, the comparison would be appropriate. Therefore, the first step is to compute the number of AC values in a target I-frame which are above predetermined threshold values (step 900). If the number of AC values computed from the previous step is greater than the number of AC values which are greater than the predetermined thresholds in a standard video I-frame (step 905), then the target I-frame is indexed as that of a cartoon (step 910). Otherwise, an alternative method of detecting cartoons should be applied (step 915).

Figure 10:
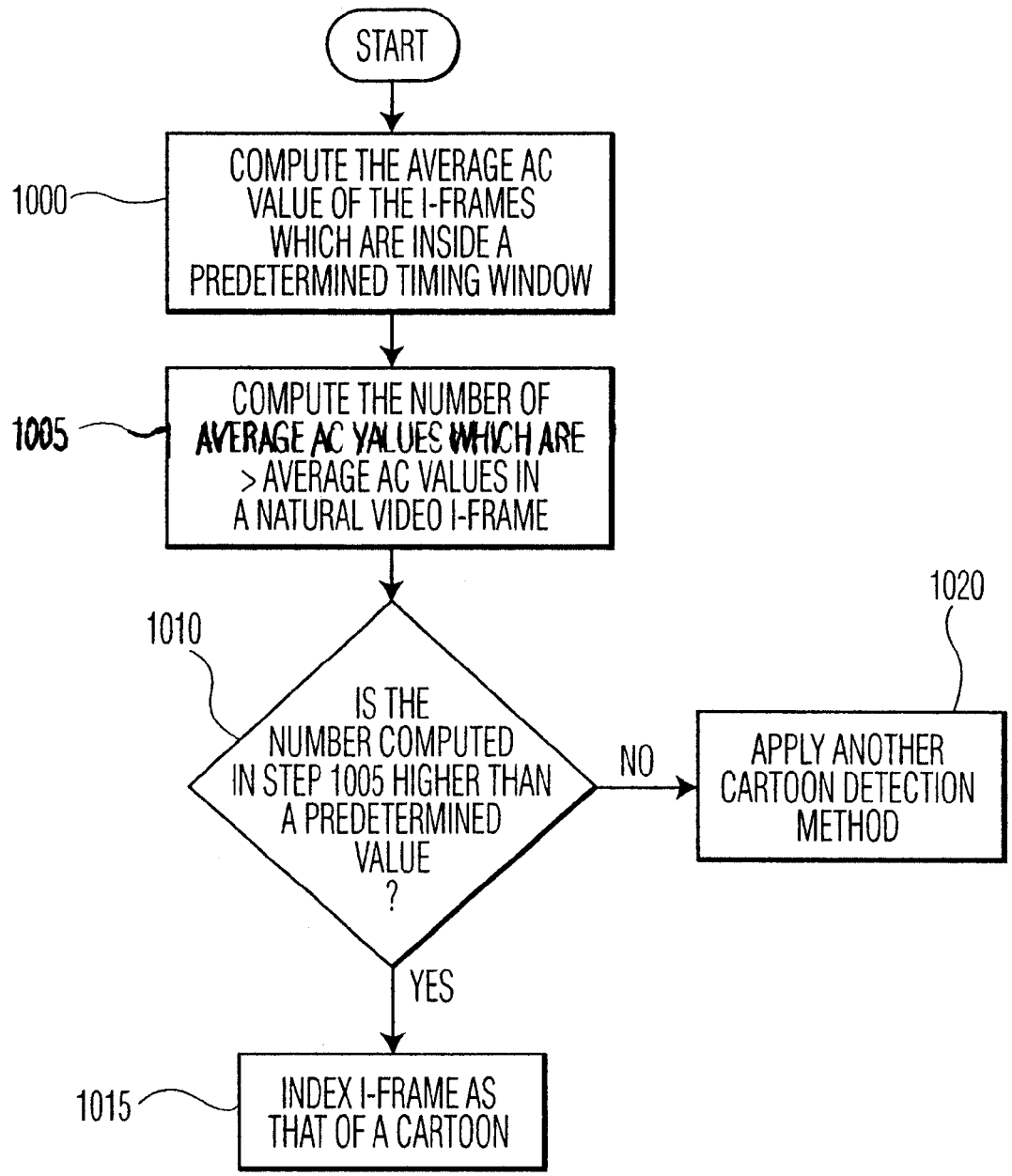
FIG. 10 is a flow chart illustrating the "AC value" detection method in accordance with second embodiment of the present invention.

Alternatively, an average AC value of the I-frames which are inside a predetermined timing window may be computed (step 1000 in FIG. 10). This would include summing up all the AC values of the I-frames which are inside the predetermined timing window and dividing by the total number of AC values in those I-frames. Similarly, a comparison to the natural video is then made. As shown in FIG. 10, in step 1005 the computation of the number of average AC values which are greater than the average AC values in a standard video I-frame is made. If this number is greater than a predetermined value (step 1010), the target I-frame is indexed as that of a television cartoon (step 1015) based on the "AC value" method.

Temporal Sampling Rate Method

Figure 11:
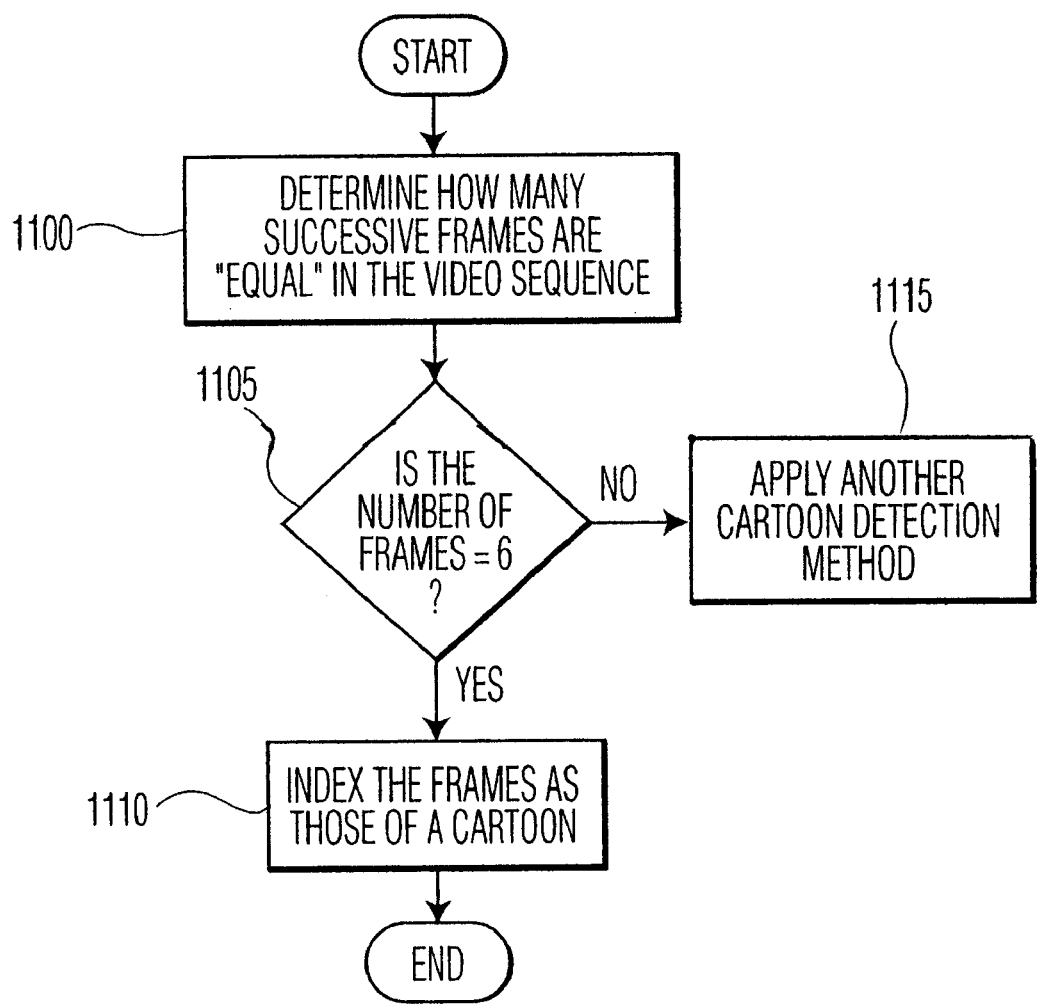
FIG. 11 is a flow chart illustrating the "Temporal Sampling rate" detection method in accordance with one embodiment of the present invention.

Typically, cartoons are sampled at 6 frames per second as opposed to natural videos which are sampled at about 24 frames per second. As shown in FIG. 11, the first step in the temporal sampling method is to determine how many successive frames are equal in the video sequence (step 1100). This determination will indicate the temporal sampling rate. Therefore, if the temporal sampling rate is equal to 6 frames per second (step 1105), then it is conclusive that the target frames are those of a cartoon (step 1110) based on the "Temporal Sampling Rate" method.

Cut Rate Method

Cut rate is the measure of high frequency the scenes are changing in a video stream. The cut rate in a typical cartoon is generally high. A cut is a change from one shot in the video to the next where a shot is the time from the camera start to the next camera stop. This means that the difference between two sequential frames in a video is small within a shot, but generally large between shots. There are many methods which are well known in the art for detecting shot boundaries. Some of these methods are disclosed in the U.S. Pat. Nos. 6,137,544 and 6,125,229, both of which are incorporated herein by reference. These methods generally compare sequential frames (or sequential I-frames) and examine the difference between them. In a preferred embodiment of the present invention, the frame differencing method to find the shot boundary is used. This method is based on macroblock differences calculated using the DC coefficients from consecutive frames. Several cut detection algorithms based on different formulae comparing DCT coefficients can be used. The cut detection algorithm applied in a preferred embodiment of the present invention is based on the following formula:

$$S = \sum_{k=1}^{w} \sum_{j=1}^{k} Mbdiff(MB_{k,j}^c, MB_{k,j}^p) \quad \text{where:} \qquad \text{(Equation 4)}$$

$$MBdiff(MB_{k,j}^c, MB_{k,j}^p) = \begin{cases} 1, \sum_{i=1}^{6} |B_{k,ji}^c, B_{k,ji}^p| > T \\ 0, \text{otherwise} \end{cases}$$

In the above Equation 4, S represents the total difference for the Y, Cr, and Cb; w=Frame–width/16; h=Frame–height/16; and $B^c$ and $B^p$ are the DCT coefficients from the current and previous blocks respectively. MBdiff is a difference function between two macroblocks, which determines the number of blocks that are different from each other. Equation 4 operates at the macroblock level. The DCT values of the luminance and chrominance blocks in a macroblock for a video frame are subtracted from their respective counterparts in another video frame. The sum of the differences is kept for each component. After all the differences are added in a macroblock, each macroblock is compared to a predetermined threshold. If this sum of differences is above the predetermined threshold, a macroblock counter is incremented. The predetermined threshold depends on the size of the block. Typically, if 75% of the total number of macroblocks differ from each other, the counter is incremented. Equation 4 finds the difference between macroblocks based on block comparison, then counts the number of different macroblocks between two frames.

The method described above, will enable one skilled in the art to find the individual cuts in a video. The cut rate change is number of cuts per minute. By using the knowledge that cartoons typically have a high cut rate, it would be sufficient to keep track of the number of cuts per unit of time. In commercial applications, this detection method is done by using a circular array. This array would use the modulo operator to keep replenishing the individual elements in a rotating fashion. Using this approach, the cut rate could be averaged over the array size. By examining the number of cuts occurring per unit of time and comparing it to a predetermined threshold, a determination of whether the program content contains a cartoon could be made.

Figure 12:
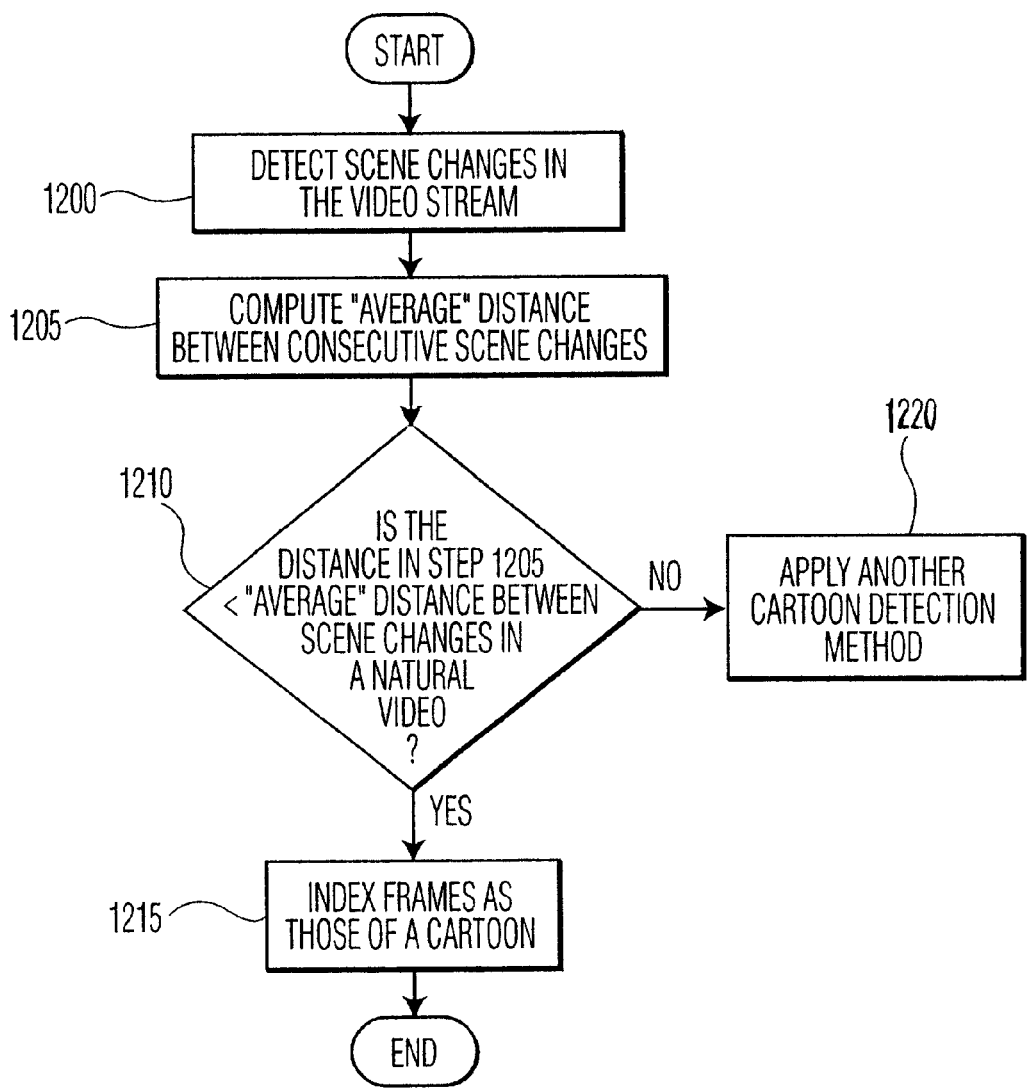
FIG. 12 is a flow chart illustrating the "Cut Rate" detection method in accordance with one embodiment of the present invention.

Therefore, as shown in FIG. 12, the first step is to detect the scene changes in the encoded video stream (step 1200). At step 1205 the average distance between consecutive scene changes is computed. This is equivalent to measuring the number of scene changes per unit of time. If the distance computed in step 1205 is less than the average distance between scene changes in a natural video (step 1210), then the frames are indexed as those of a cartoon (step 1215) based on the "Cut rate" method.

Scene Cuts with Color Similarity Method

Figure 13:
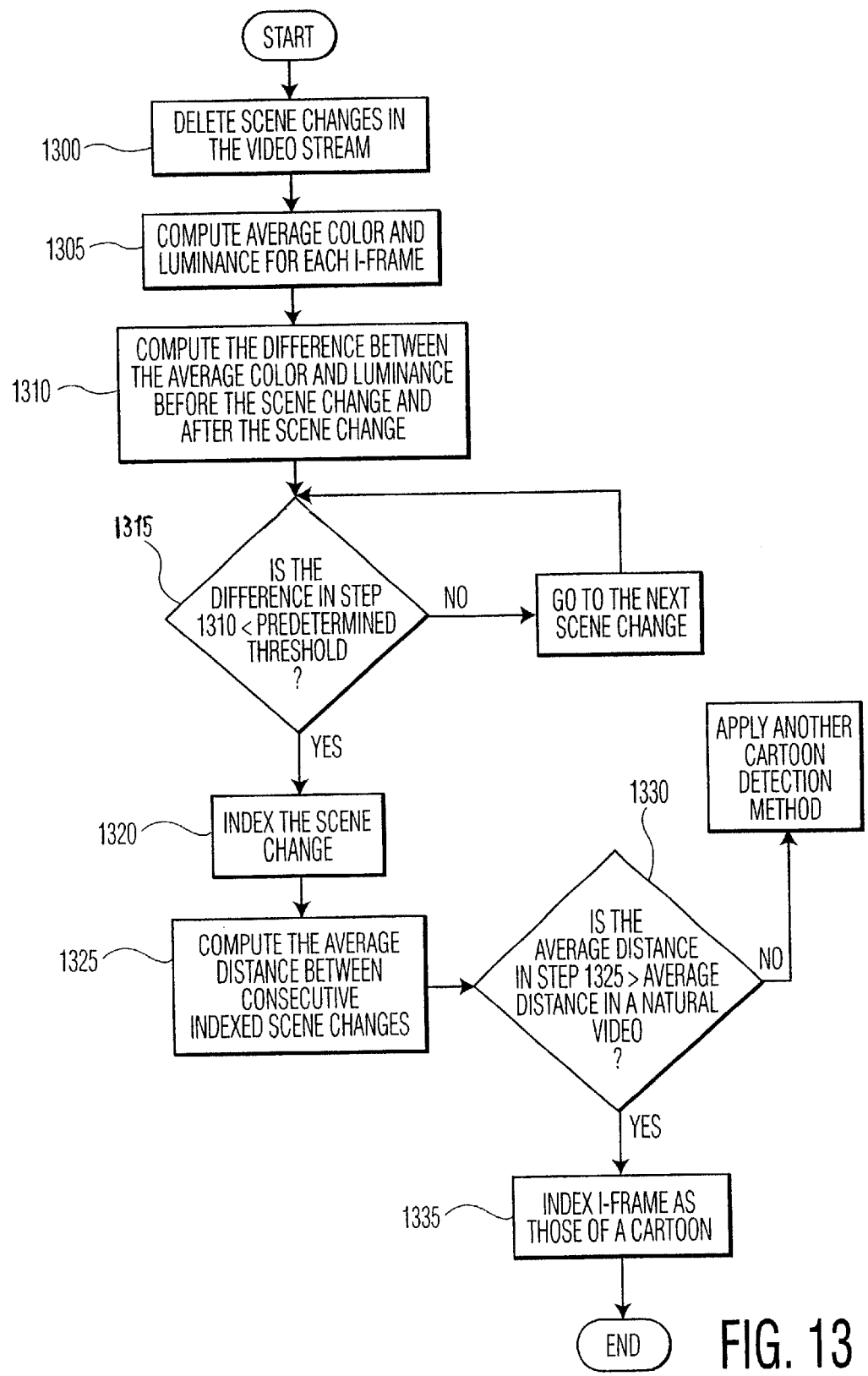
FIG. 13 is a flow chart illustrating the "Cut Rate with Color Similarity" detection method in accordance with one embodiment of the present invention.
Figure 14:
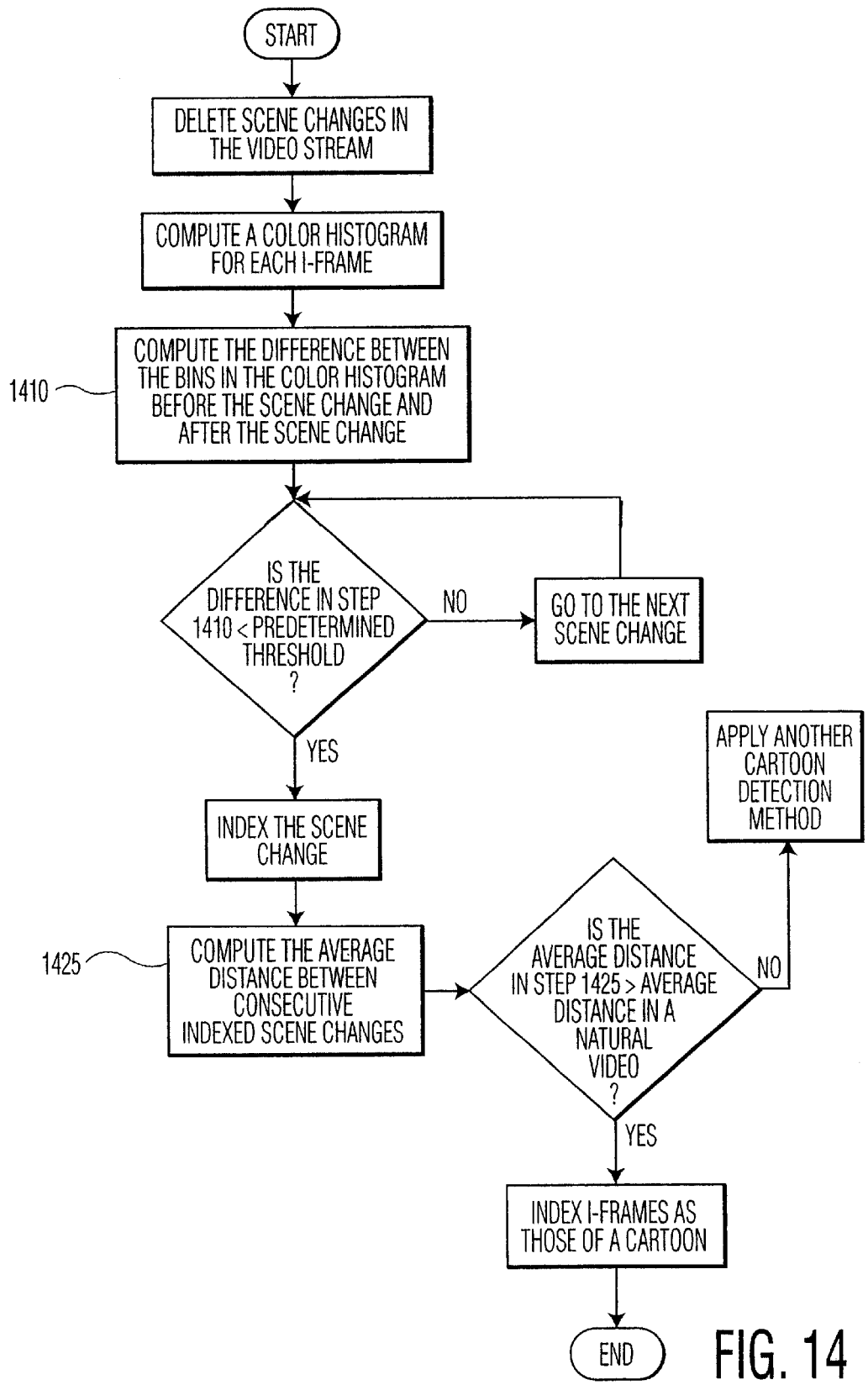
FIG. 14 is a flow chart illustrating the "Cut Rate with Color Similarity" detection method in accordance with second embodiment of the present invention.

According to a preferred embodiment of the present invention as shown in FIG. 13, the first step in the above-identified method is to detect the scene changes in the encoded video stream (step 1300). This can be achieved according to the methods described above. At the next step 1305, the average color and luminance is computed for each I-frame in the video stream. There are many methods which are well known in the art for computing average color and luminance. The preferred method is to cluster all the pixels in groups of similar color and to take the average of the dominant region. Alternatively, clustering all pixels in groups of similar color and weighting the groups according to their number of pixels which are represented and weighted according to the distance to the most dominant region, can also be implemented. Yet another alternative is to simply calculate the average value of all the pixels in the frame. This can be done in YCrCb color space or alternatively in RGB or HSV color space as well. Based on the scene changes detected initially in step 1300, the next step 1310 is to compare the average color and luminance of the I-frame before the scene change with the average color and luminance of the I-frame after the scene change. Where the difference between the average color and luminance of the I-frame before and after the scene change is below a predetermined threshold value (step 1315), the scene change is indexed (step 1320). Experimentally, the threshold values can range as follows: for Y—(0.12–18.2), for Cb—(0.001–0.002), for Cr—(3.3–1605). Conversely, if the difference is above a predetermined threshold value, then it is clear that the initially detected scene change is a real shot cut. Often, however, shot cuts may be detected where they do not exist because the cartoon makers draw the frames by hand and simply connect them. In this case the luminance and chrominance (color) value before and after the fake shot cut are close to each other. This unique cartoon characteristic is used for detection purposes in step 1315, where the indexed scene change boundary has a fairly uniform color and luminance difference. In step 1325, the average distance between consecutive indexed scene changes is computed. If this average distance is greater than the average distance between the indexed scene changes in a natural video (step 1330), then the target I-frames are indexed as those of a cartoon (step 1335) based on the "Scene cuts with color similarity" method. Alternatively, instead of average color and luminance calculation, a color histogram may be used as shown in FIG. 14. All the steps are similar except that in step 1410 as opposed to step 1310, the difference between the bin sizes in the color histogram before and after the scene change is calculated. If the difference is below a predetermined threshold, the scene change is indexed.

Velocity Histogram Method

Figure 15:
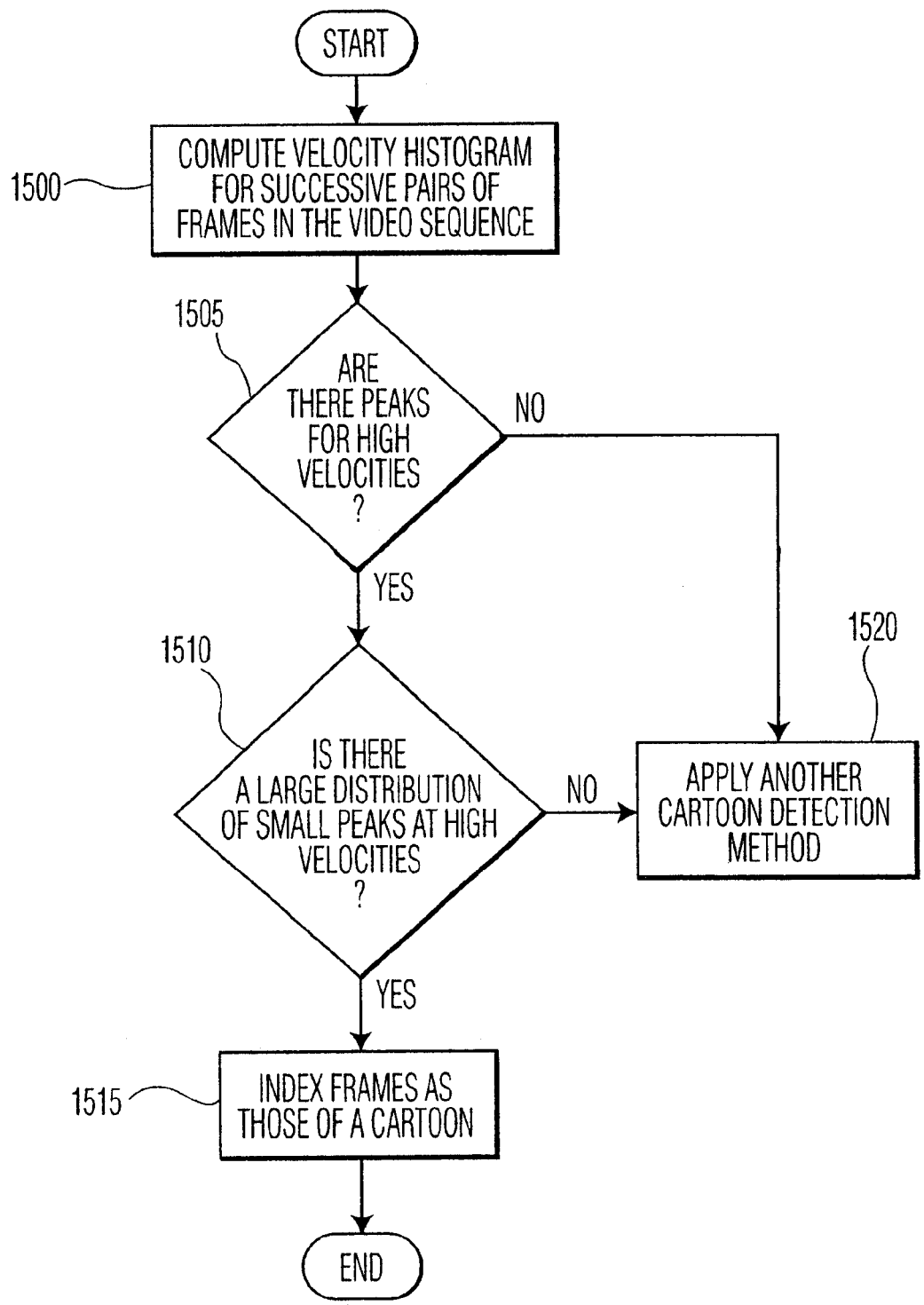
FIG. 15 is a flow chart illustrating the "Velocity Histogram" detection method in accordance with one embodiment of the present invention.
Figure 16:
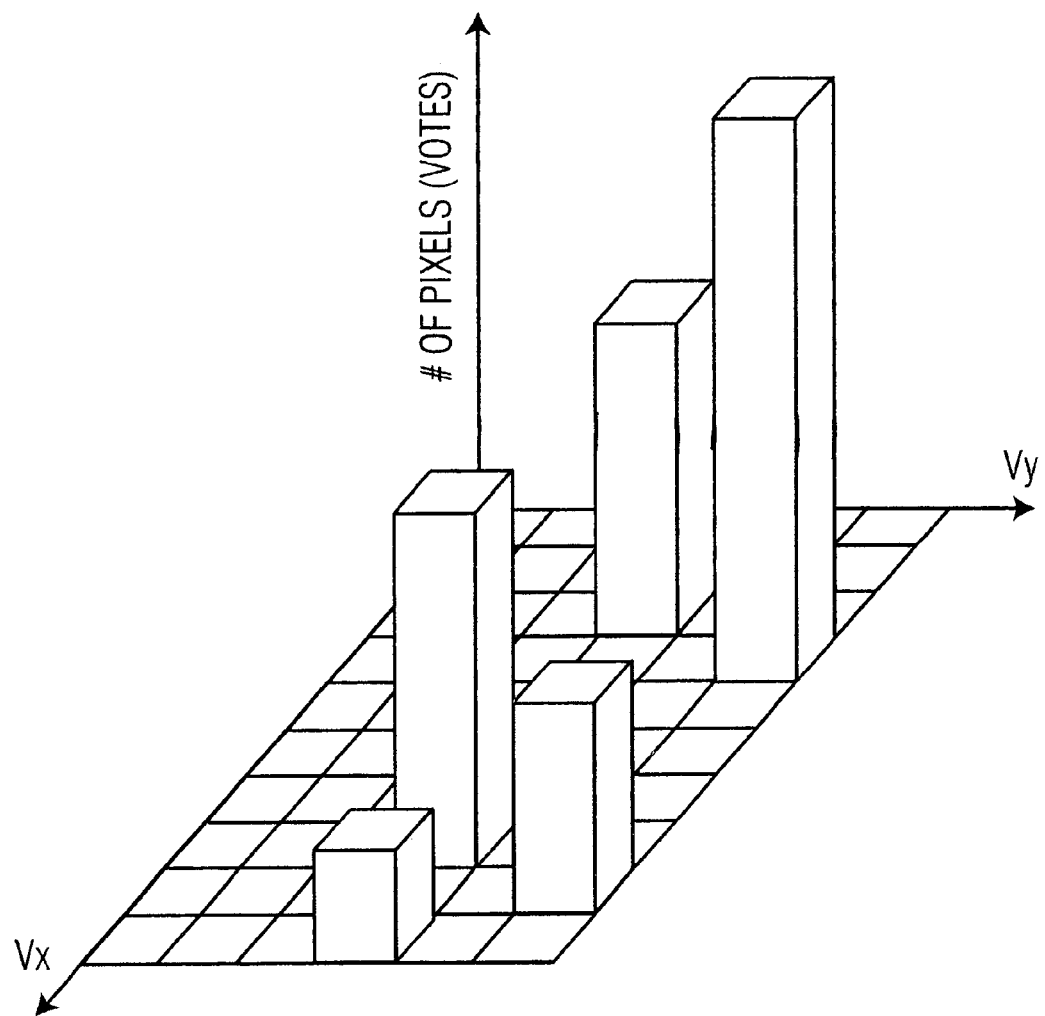
FIG. 16 is a graphical illustration of a typical velocity histogram.

Generally, motion in cartoons can be characterized as having high velocity. The above-identified method takes advantage of this unique characteristic by computing a velocity histogram and comparing to a velocity histogram for a natural video. Hence, the first step as shown in FIG. 15 is to compute a velocity histogram for successive pairs of frames in the video sequence (step 1500). A typical velocity histogram is illustrated in FIG. 16, which shows a three dimensional graph with the velocity of a 16×16 macroblock in the vertical direction on the y-axis (Vy) and the velocity the same macroblock in the horizontal direction (Vx) on the x-axis. Z-axis represents a number of pixels (votes) in a given frame. The closer to the origin of the histogram the lower the velocities. If the velocity histogram has peaks for larger velocity (step 1505) and a larger distribution for small peaks at higher velocities (step 1510), then the target I-frame is indexed as that of a cartoon (1515) based on the "Velocity Histogram" method.

Frame Signature Method

Cartoons can be characterized as having large areas of uniform color. Signatures can be developed to identify only the largest regions of similar color in the frame using the CR and Cb components of the video stream. In the frequency domain, the frame consists of individual 8×8 blocks of discrete cosine information. There are blocks for intensity (Y blocks) and blocks for color (Cr and Cb blocks) as illustrated in FIG. 3. From the Cr and Cb blocks a signature is derived based on the DC coefficient and the highest values of the AC coefficients in each block of the frame. Subsequently, the adjacent blocks are compared and those with the same signatures are coalesced into regions. A region is defined by the elementary color block signatures (Cr, Cb), its size (the number of adjacent blocks with the same signature) and the center location of block groups. The region signatures are built from the individual block signatures as described below and in U.S. Pat. Nos. 6,125,229 and 6,137,544 which are incorporated herein by reference.

Figure 17:
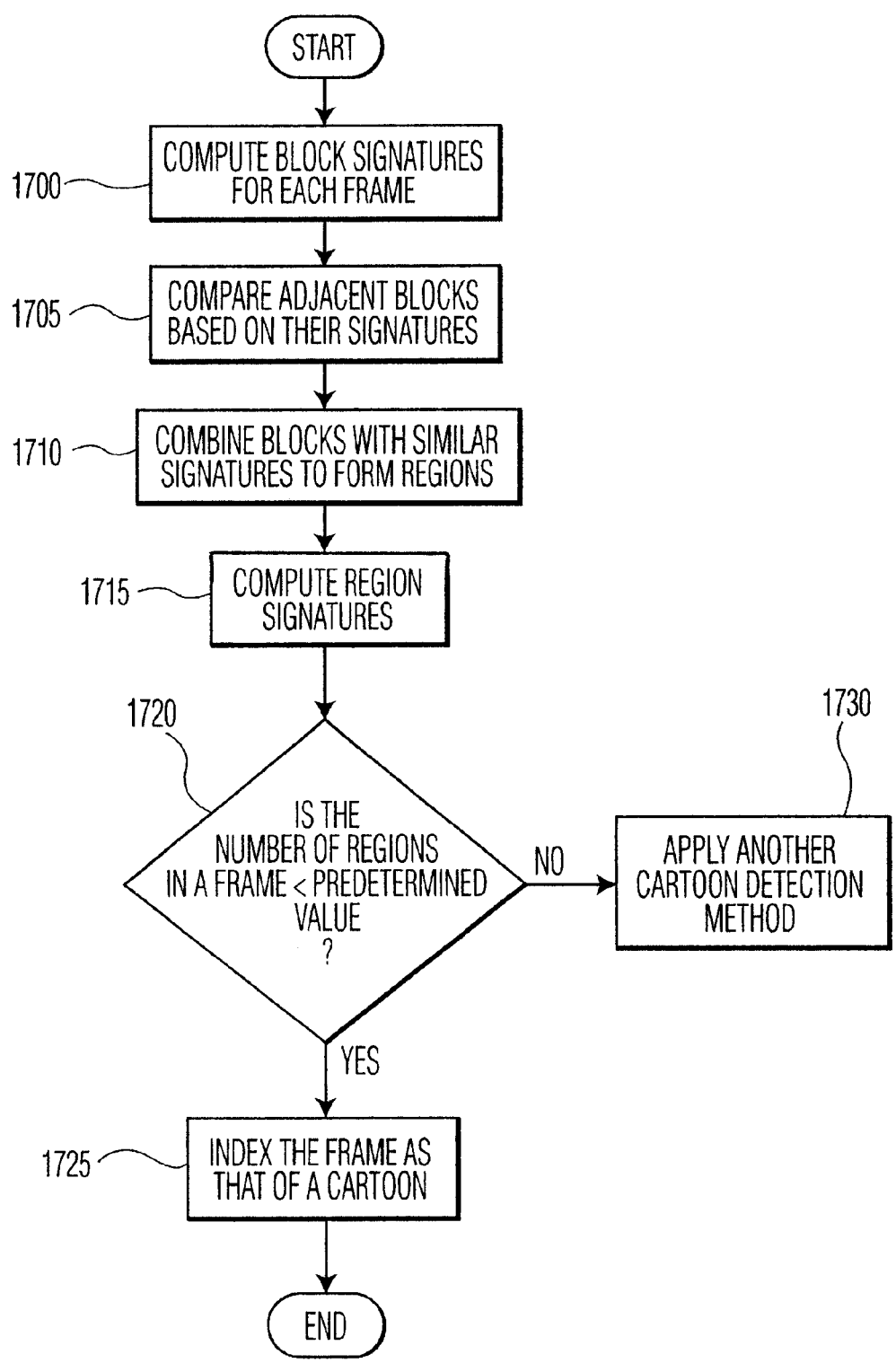
FIG. 17 is a flow chart illustrating the "Frame Signature" detection method in accordance with one embodiment of the present invention.
Figure 18:
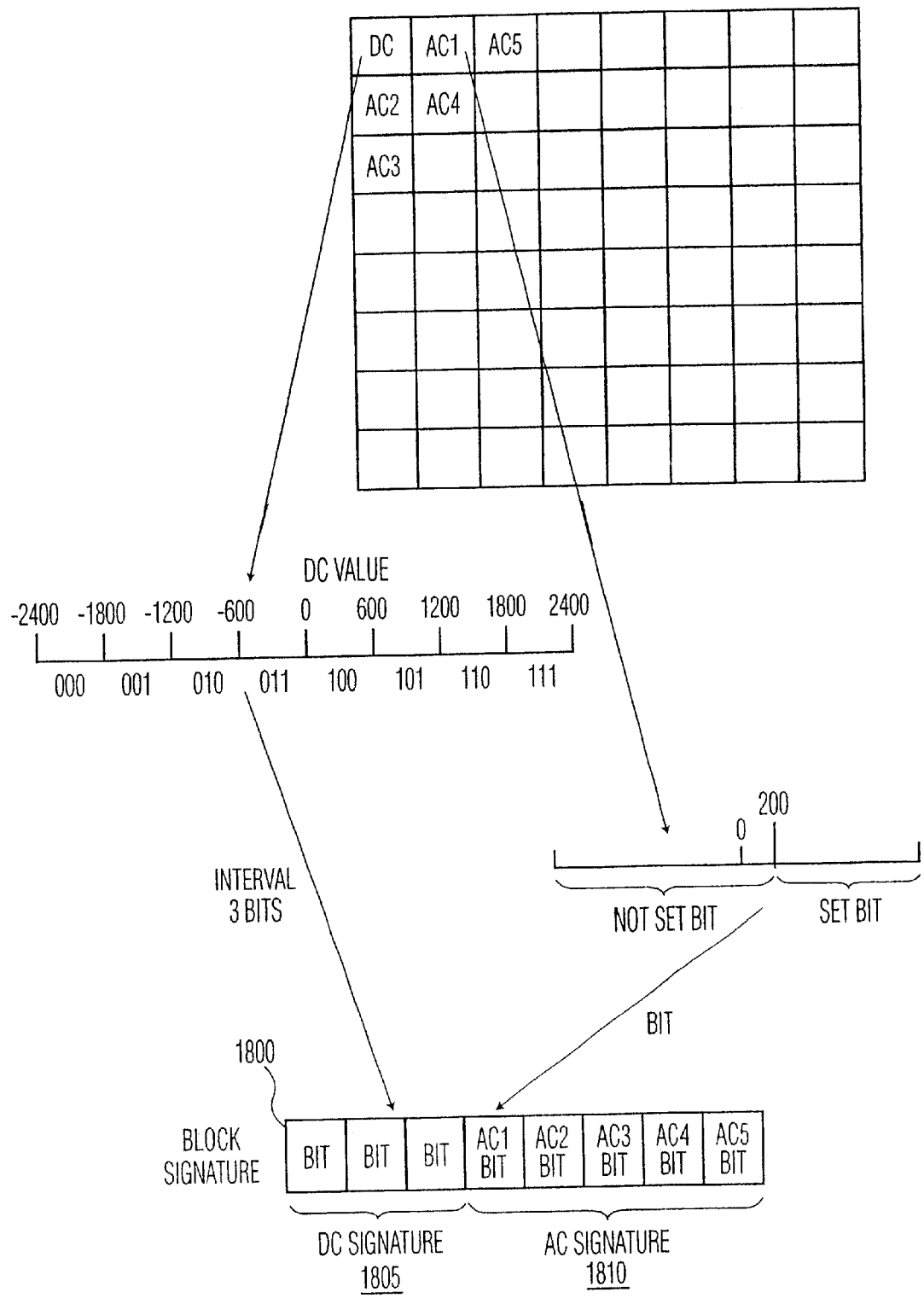
FIG. 18 is an illustration of the block signature creation process.

As shown in FIG. 17 in step 1700, the block signatures are derived for each block in a frame first. The block signature 1800 is, in this example, eight bits long, three of which represent a DC signature 1805 and five of which represent an AC signature 1810, as shown in FIG. 18. All other DCT coefficients in a block besides the DC value are AC values.

The DC signature is derived by extracting the DC value and determining where the DC value falls within a specified range of values, in this example, between −2400 and 2400. The range is divided into a preselected number of intervals as shown in FIG. 18. In the present invention, eight intervals are used, although more or less intervals may be used for greater or lesser granularity of an image.

Each interval is assigned a predefined mapping such as that shown in FIG. 18. Each DC value is compared to the range and the mapping for the interval into which the DC value falls is returned. The value represented by the bits needed corresponds to the number of intervals. In this example, since the range is divided into eight intervals, three bits are used. As shown in FIG. 18, the block signature 1800 will thus include the DC signature 1805 as the first three bits and the AC signature 1810 as the remaining five bits.

To give a good representation of a range of AC values for the block, the five AC values closest to the DC values (A1–A5) are extracted, as shown in FIG. 18. Each of the five AC values is compared to a threshold, in this example, 200 and if the AC value is greater than the threshold, a corresponding bit in the AC signature 1810 is set to a predetermined value such as one, and if less or equal to the threshold, the corresponding bit is set to zero.

After deriving the block signatures (BlockSignature) for each block of each macroblock in the frame, regions are determined (step 1715). Regions are, in this example, two or more blocks, each block of which neighbors at least one other block in the region and which shares a similar block signature to the other blocks in the region. More blocks could be required to define a region if timing is desired to be decreased. Although each block signature of the frame could be compared to each other block signature and then counted to determine regions (steps 1705, 1710), the present invention may use a known technique such as a region growing process to determine regions within a frame.

Region growing method is used for isolating regions in the image. Traditional region growing methods use pixel color and neighborhood concepts to detect regions. In the present invention, block signatures are used as a basis for growing regions.

During the region growing process, a region counter is kept for each region to count the number of blocks in a region (size), and is represented by 16 bits. Once the entire frame has been analyzed to find the regions, another known method may be used to find a centroid or center of each region, which, in this example, is based on an x-y axis reference. Both the x and y coordinates are extracted as CX and CY, respectively, and are represented by 16 bits. Each region is then assigned a region signature, RegionSignature (Cr_BlockSignature, Cb_BlockSignature, size, CX, CY). The block signature for the region is determined based on a most dominant block signature as determined by the region growing process.

Regions generally represent an "object" which may be an object, person, thing, etc. The region signatures can now be used to detect whether the frame is a cartoon type of frame. For example, if only a few large objects make up the majority of the frame, it is probably a cartoon. Therefore, in step 1720 the comparison is made between the number of regions in the target frame and the predetermined threshold value. If the number of regions is greater than the threshold it can be concluded that the target frame is that of a cartoon (step 1725) based on the "Frame signature" method.

MAD Value Method

Motion in a typical cartoon is more abrupt and therefore the changes from frame to frame, not counting the "cut" areas, are more significant than in a natural video. Accordingly, it would be appropriate to evaluate these changes and compare them to a standard video, whereupon a cartoon can be detected. In a preferred embodiment of the present invention, MAD, which stands for the Mean Absolute Difference, makes a comparison of the two best matching macroblocks in the two successive frames and calculates the maximum difference value in the pixel domain based on the luminance information. Alternatively, it can be defined as the average of the absolute values of the 256 luminance differences. MAD values are calculated independent of the sort of frame (I, P or B) and can be used to detect shot cuts in between frames because during a shot-cut the information changes from one frame to the next frame. Alternatively, the difference among frames can be computed through MSE (Mean Square Error), which is the average of the squares of the 256 luminance differences. Generally, chrominance is ignored when computing the error because the eye is more sensitive to changes in luminance. The MAD method produces results similar to the MSE, but at a much lower computational cost. Additionally, normalized crossed correlation function (NCCF) or the number of significant different pixels (NSDP) can be used instead of MAD values, but again, at a much higher computational cost.

Figure 19:
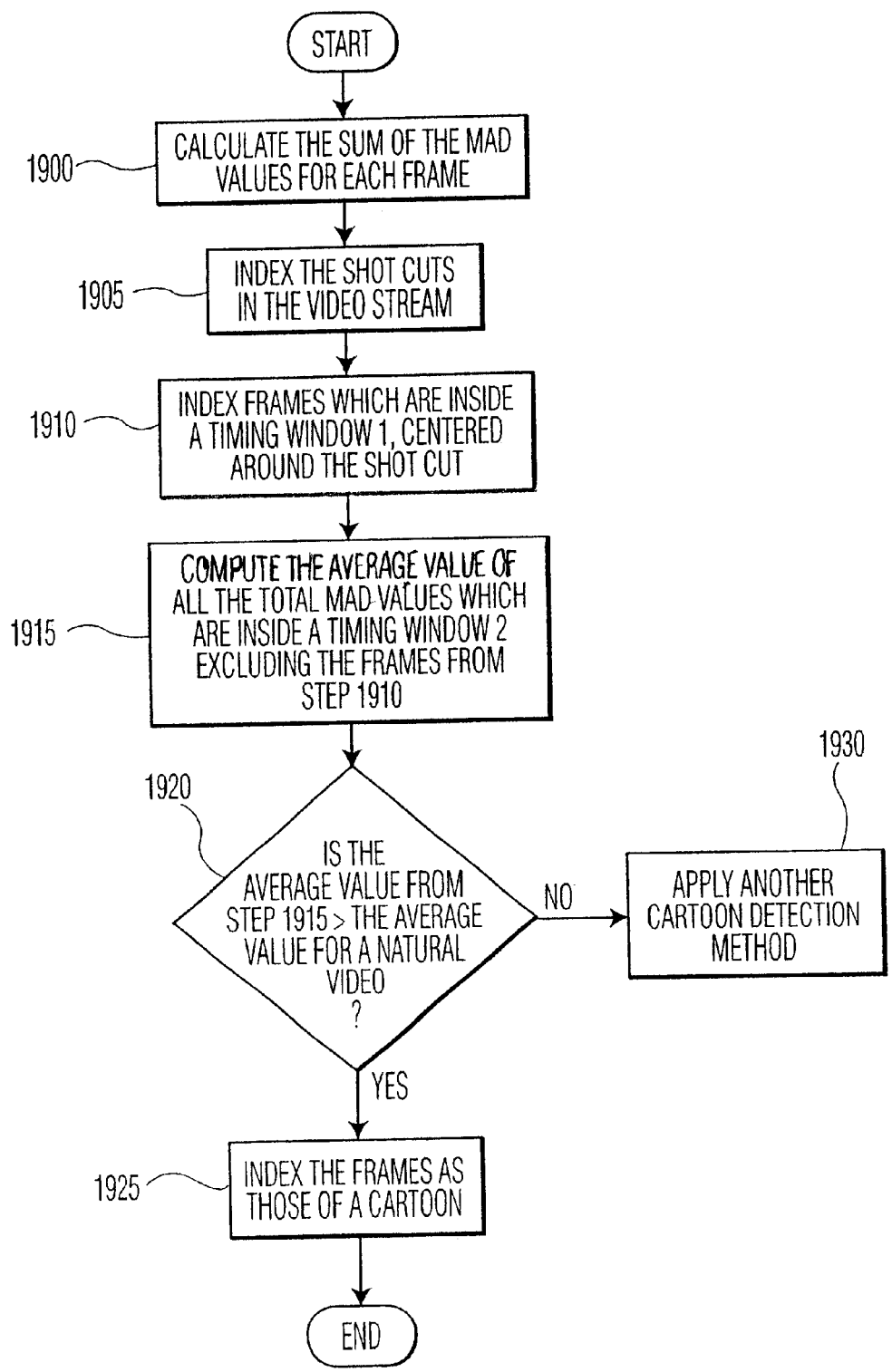
FIG. 19 is a flow chart illustrating the "MAD value" detection method in accordance with one embodiment of the present invention.

As shown in FIG. 19, the first step 1900 is to calculate for each I-frame the sum of the MAD values of all macroblocks in the frame (total MAD value). The next step 1905 is to detect and index (i.e., identify the shot cut and mark it as a shot cut) all of the shot cuts in the encoded video stream applying any methods described above. Generally, the MAD values near the shot cut are very high and would make the total MAD value extremely high. Therefore, the following calculation needs to be made: the sum of all MAD values of all frames (N number of frames) excluding the MAD values around the shot cut (M number of frames) divided by the number of all valid frames (N-M number of frames). This will produce the average total MAD value. This result is then compared to the average total MAD value in a standard video and determination is made whether the target frames are those of a cartoon.

Accordingly, in step 1910, the I-frames which are inside a first timing window centered around the shot cut are indexed. In step 1915, the above described calculation is made: the average value of all the "total MAD values" of all the I-frames, which are inside a second timing window excluding the "total MAD values" of indexed I-frames from step 1910. The result of step 1915 is then compared to a standard video: if it is higher than in the standard video (step 1920), then the target I-frames are indexed as those of a cartoon (step 1925) based on the "MAD value" method.

Those of ordinary skill in the art will appreciate that the present invention is not limited to the foregoing threshold conditions. The conditions imposed on the thresholds will be experimentally determined and would differ on a case by case basis.

While the invention has been described in connection with preferred embodiments, it will be understood that modifications thereof within the principles outlined above will be evident to those skilled in the art and thus, the invention is not limited to the preferred embodiments, but is intended to encompass such modifications.

What is claimed is:

1. A method of detecting a cartoon sequence, said method comprising the steps of:
   obtaining a video data stream;
   extracting data from said video data stream;
   computing at least one first value based on said data indicative of at least one characteristic of a typical cartoon;
   comparing said at least one first value to a second value indicative of said at least one characteristic of a natural video sequence; and
   determining whether said video data stream contains a cartoon sequence based on said comparison.

2. The method of claim 1, wherein said video data stream is encoded.

3. The method of claim 1, wherein said characteristic is a video characteristic.

4. The method of claim 3, wherein said video characteristic is color uniformity.

5. The method of claim 4, wherein said computed value is a number of dominant peaks in a color histogram.

6. The method of claim 4, wherein said computed value is an average distance between consecutive peaks in a color histogram.

7. The method of claim 4, wherein said computed value is a region signature for each frame.

8. The method of claim 3, wherein said video characteristic is non-uniform motion.

9. The method of claim 8, wherein said computed value is a sum of mean absolute difference errors of all macroblocks in a frame.

10. The method of claim 3, wherein said video characteristic is a temporal sampling rate.

11. The method of claim 3, wherein said video characteristic is distinct region boundaries.

12. The method of claim 11, wherein said computed value is an average number of regions having distinct boundary and uniform color.

13. The method of claim 3, wherein said video characteristic is a change in contrast.

14. The method of claim 13, wherein said computed value is a number of AC values which are above a predetermined threshold.

15. The method of claim 13, wherein said computed value is an average AC value.

16. The method of claim 3, wherein said video characteristic is a high cut rate.

17. The method of claim 16, wherein said computed value is an average distance between consecutive scene changes.

18. The method of claim 3, wherein said computed value is an average color and luminance difference between before a scene change and after said scene change.

19. The method of claim 3, wherein said computed value is an average difference between color histogram bin sizes before a scene change and after said scene change.

20. The method of claim 3, wherein said video characteristic is a high frame velocity.

21. The method of claim 20, wherein said computed value is an average velocity histogram bin size.

22. A system for detecting a cartoon sequence, said system comprising:
 a communications device for receiving a video signal;
 a storage device capable of storing said video signal;
 a processor operatively associated with said communications device and said storage device, said processor being configured to:
 extract data from said video signal;
 determine whether said video signal contains said cartoon sequence based on a predetermined method; and
 generate an output based on said determination to be stored in said storage device.

23. The system of claim 22, wherein said video signal is encoded.

24. The system of claim 22, wherein said predetermined method is based on a color histogram of a frame.

25. The system of claim 22, wherein said predetermined method is based on mean absolute difference values of macroblocks in a frame.

26. The system of claim 22, wherein said predetermined method is based on an edge map for the luminance component of an I-frame and color histogram of said I-frame.

27. The system of claim 22, wherein said predetermined method is based on AC values of an I-frame.

28. The system of claim 22, wherein said predetermined method is based on temporal sampling rate of said video signal.

29. The system of claim 22, wherein said predetermined method is based on a cut rate of said video signal.

30. The system of claim 22, wherein said predetermined method is based on a cut rate of said video signal and average chrominance and luminance of an I-frame.

31. The system of claim 22, wherein said predetermined method is based on a cut rate of said video signal and a color histogram of an I-frame.

32. The system of claim 22, wherein said predetermined method is based on a velocity histogram of frames in said video signal.

33. The system of claim 22, wherein said predetermined method is based on block signatures for a frame.

34. A system for detecting a cartoon sequence, said system comprising:
 means for obtaining a video data stream;
 means for extracting data from said video data stream;
 means for determining whether said video data stream contains said cartoon sequence based on at least one predetermined method; and
 means for generating an output signal based on said determination.

35. The system of claim 34, wherein said predetermined method utilizes said video data.

36. The system of claim 34, further comprising means for storing said video data stream and said output signal.

37. The system of claim 34, wherein said video data stream is encoded.

38. The system of claim 34, wherein said predetermined method is a Color Histogram method.

39. The system of claim 34, wherein said predetermined method is an Edge Map method.

40. The system of claim 34, wherein said predetermined method is an AC value method.

41. The system of claim 34, wherein said predetermined method is a Temporal Sampling Rate method.

42. The system of claim 34, wherein said predetermined method is a Cut rate method.

43. The system of claim 34, wherein said predetermined method is a Scene cuts with color similarity method.

44. The system of claim 34, wherein said predetermined method is a Velocity Histogram method.

45. The system of claim 34, wherein said predetermined method is a Frame signature method.

46. The system of claim 34, wherein said predetermined method is a MAD value method.

* * * * *